May 19, 1942. C. J. DELEGARD 2,283,492
CELL CASE MACHINE
Filed Aug. 16, 1939 16 Sheets-Sheet 1
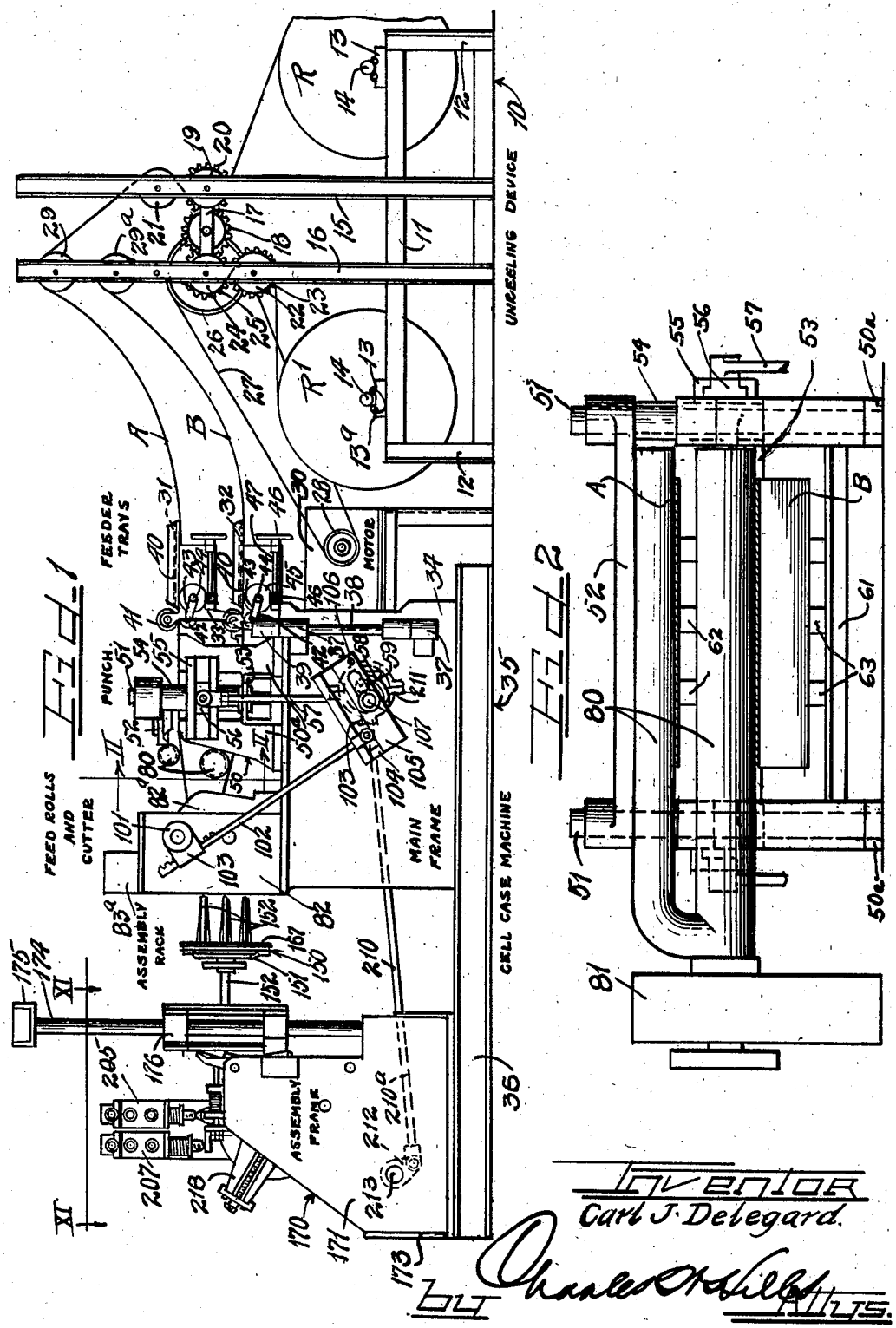
Inventor
Carl J. Delegard.
by Charles W. Hills
Attys.

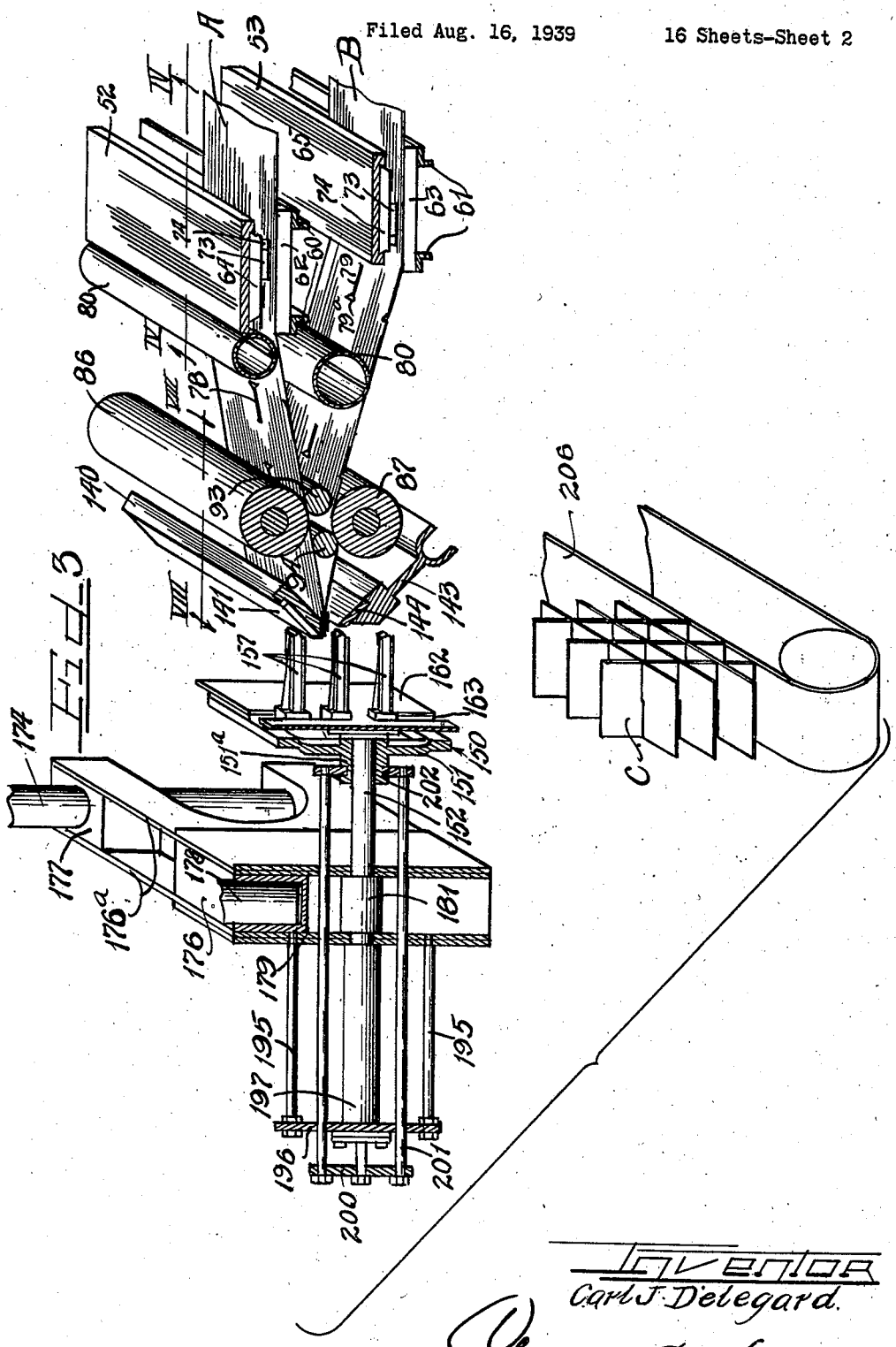

May 19, 1942. C. J. DELEGARD 2,283,492
CELL CASE MACHINE
Filed Aug. 16, 1939 16 Sheets-Sheet 3
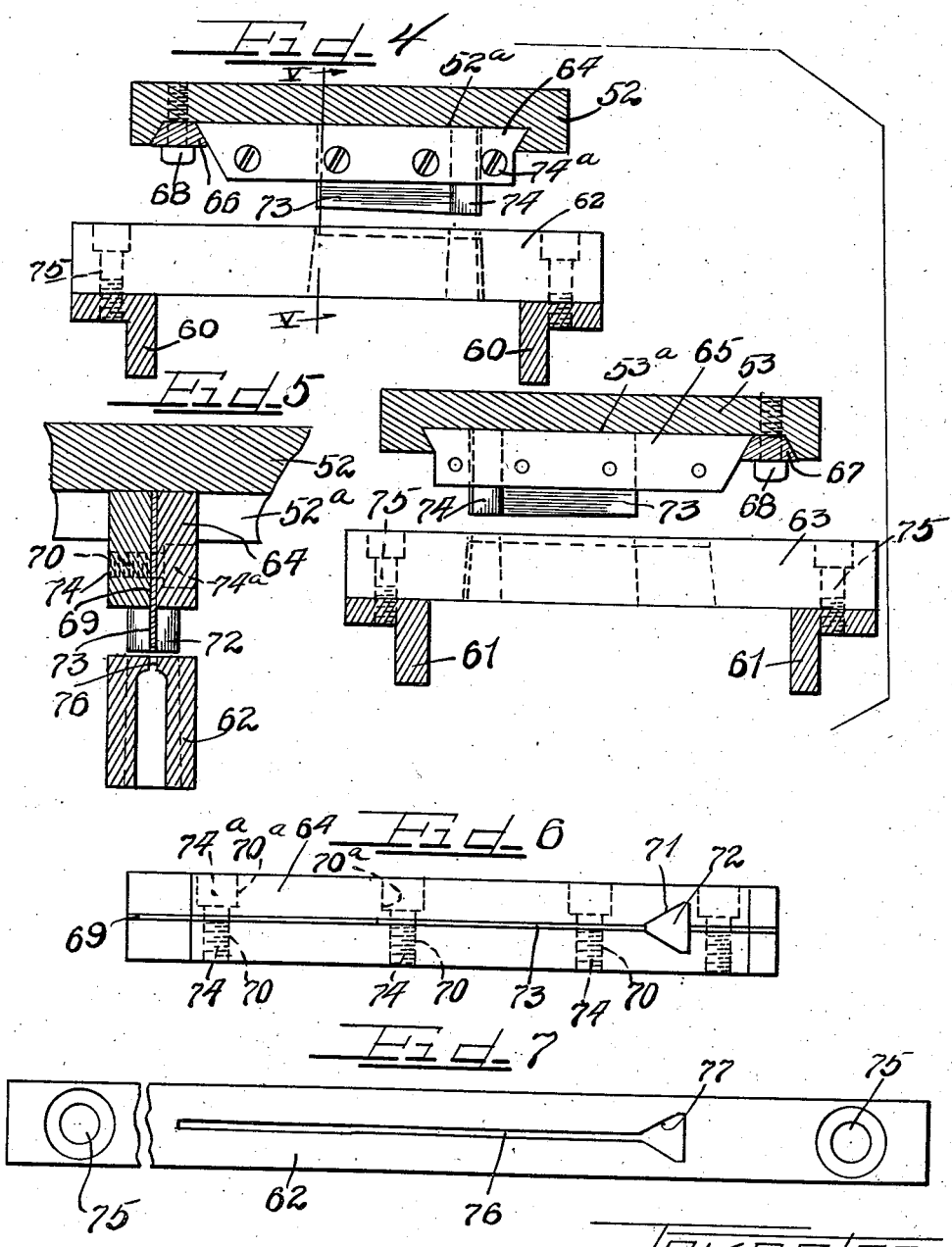

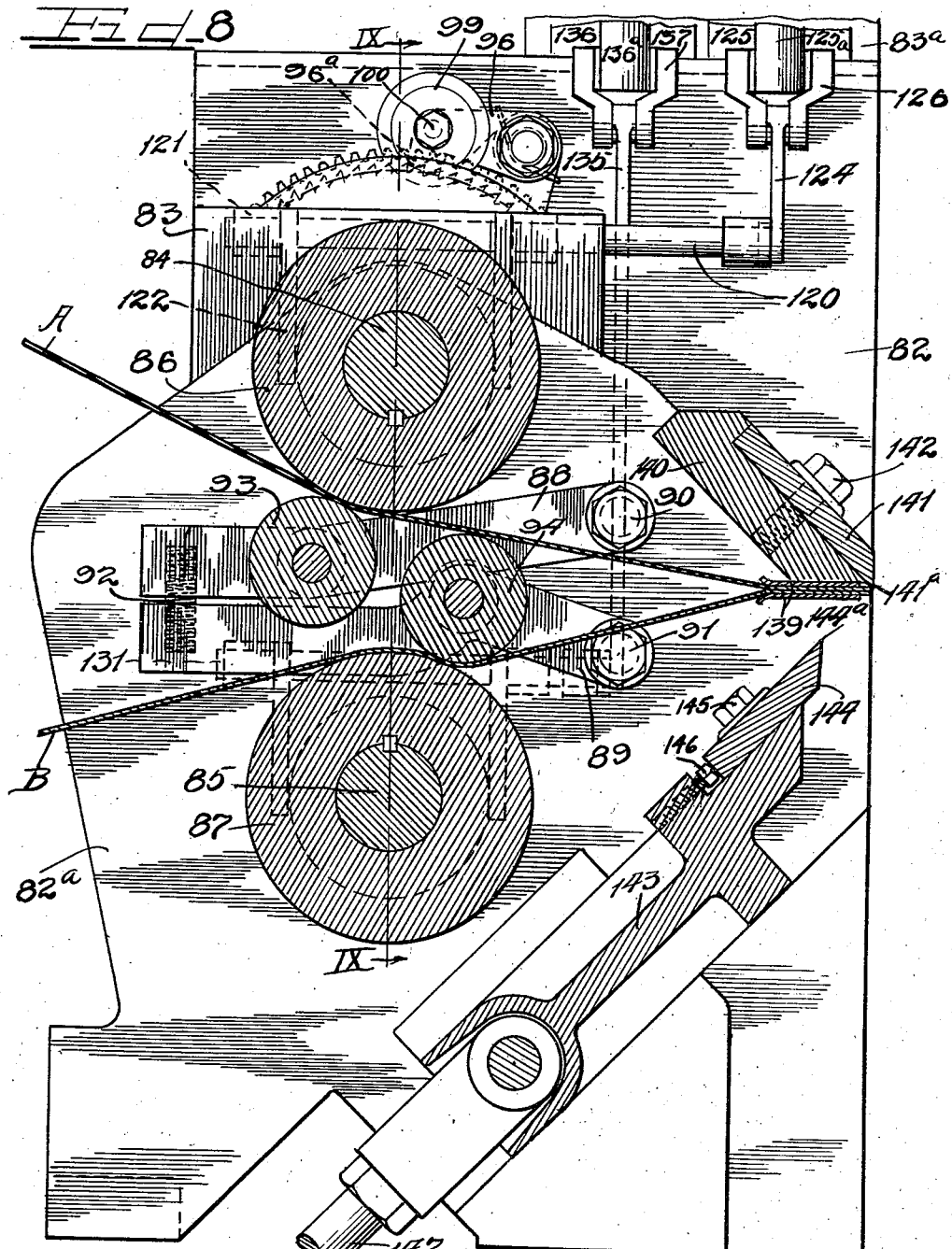

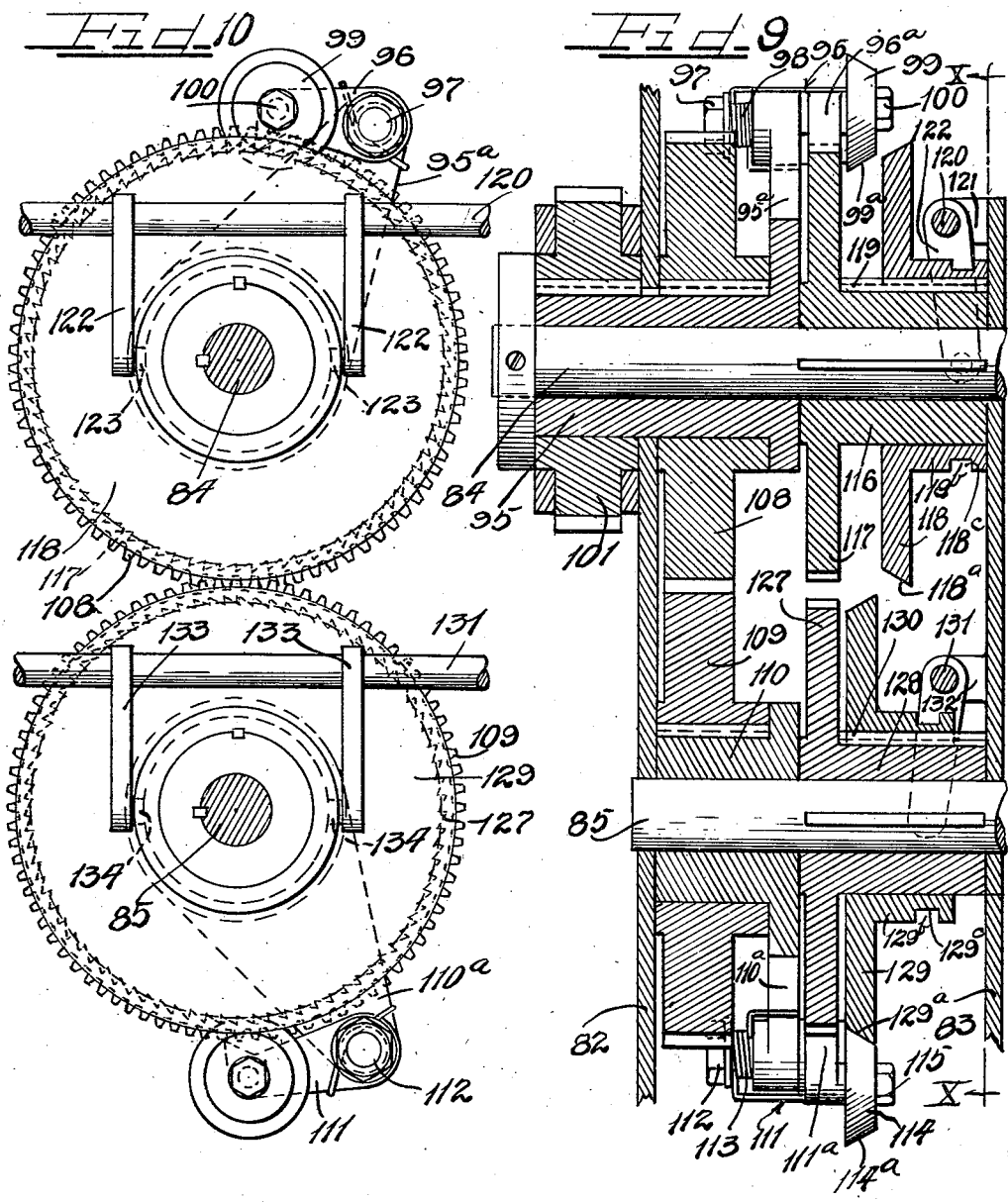

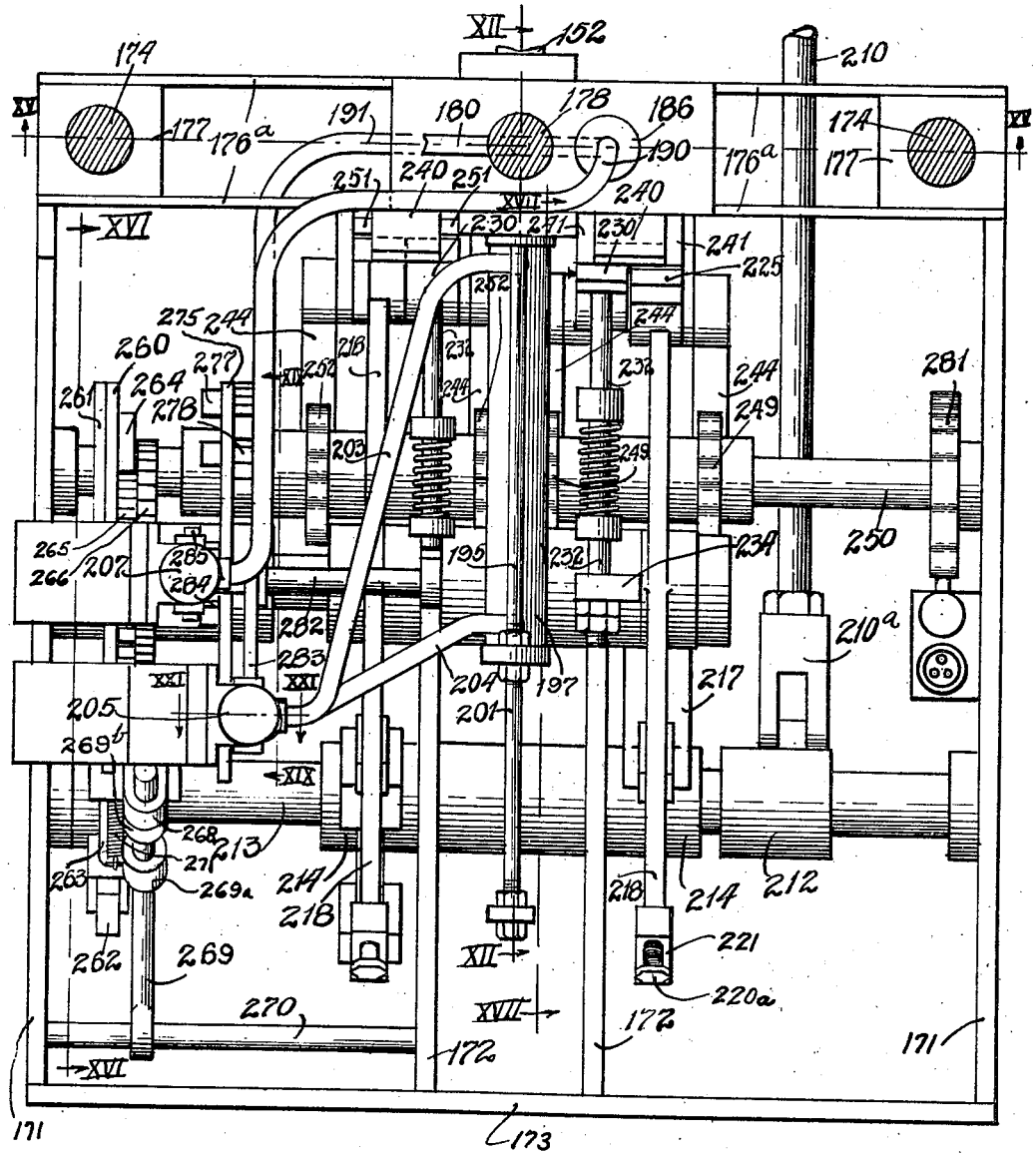

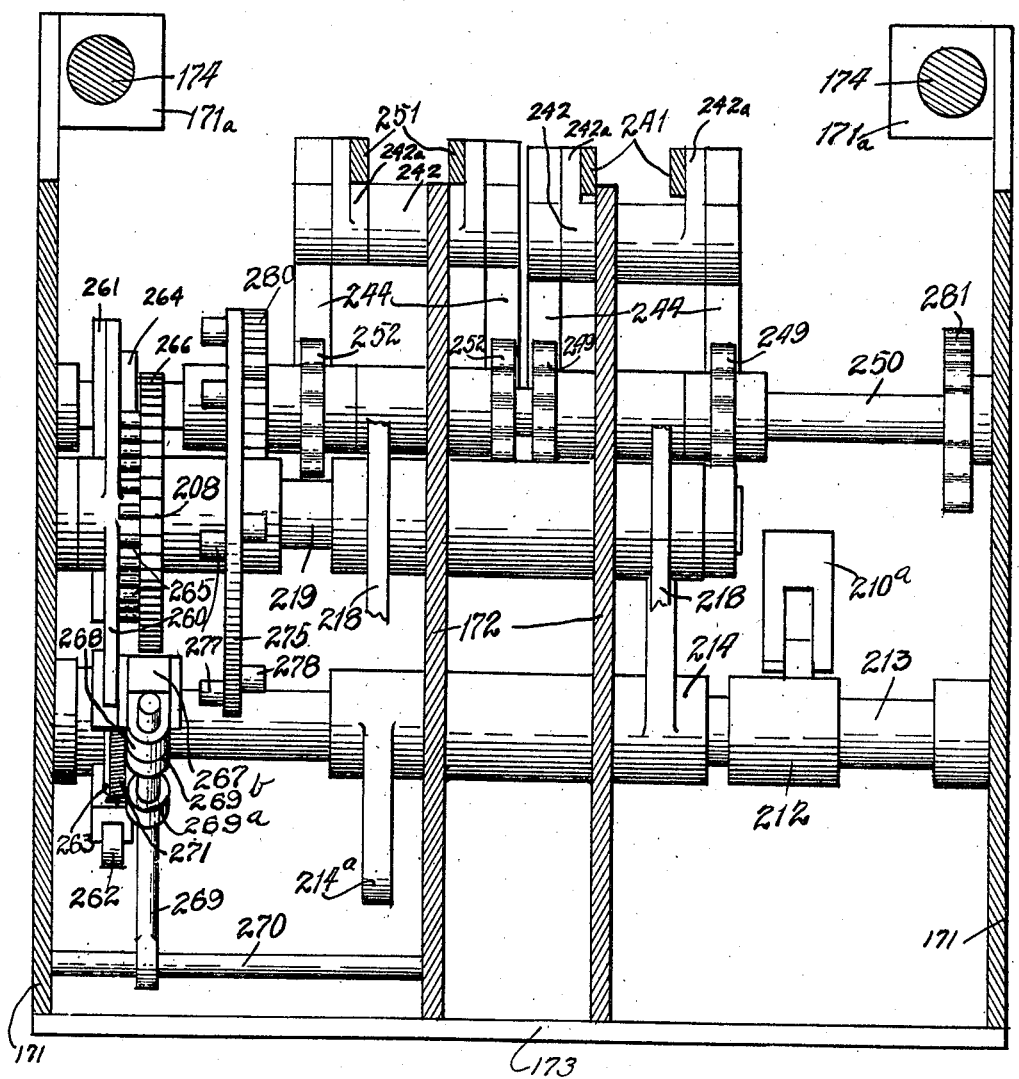

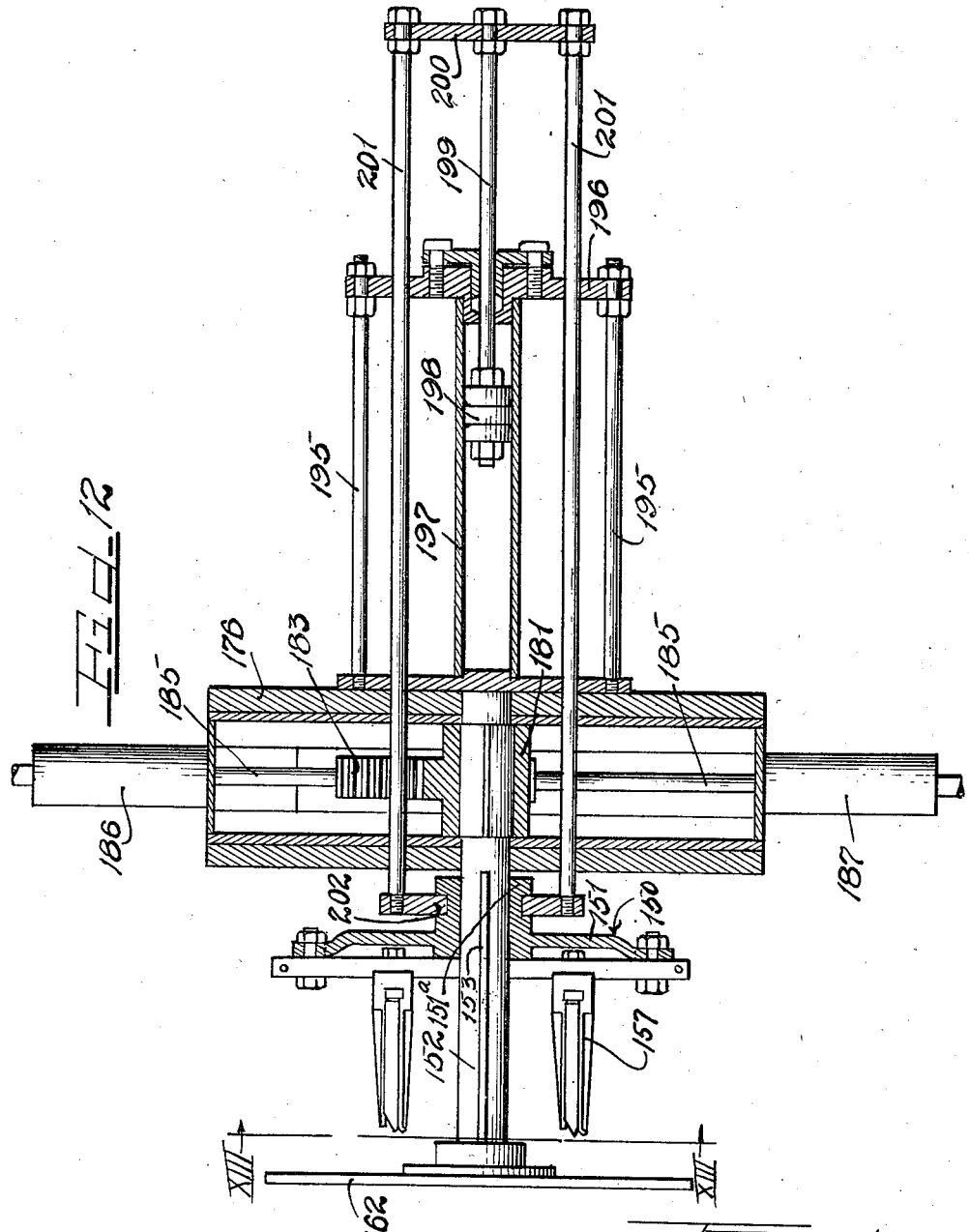

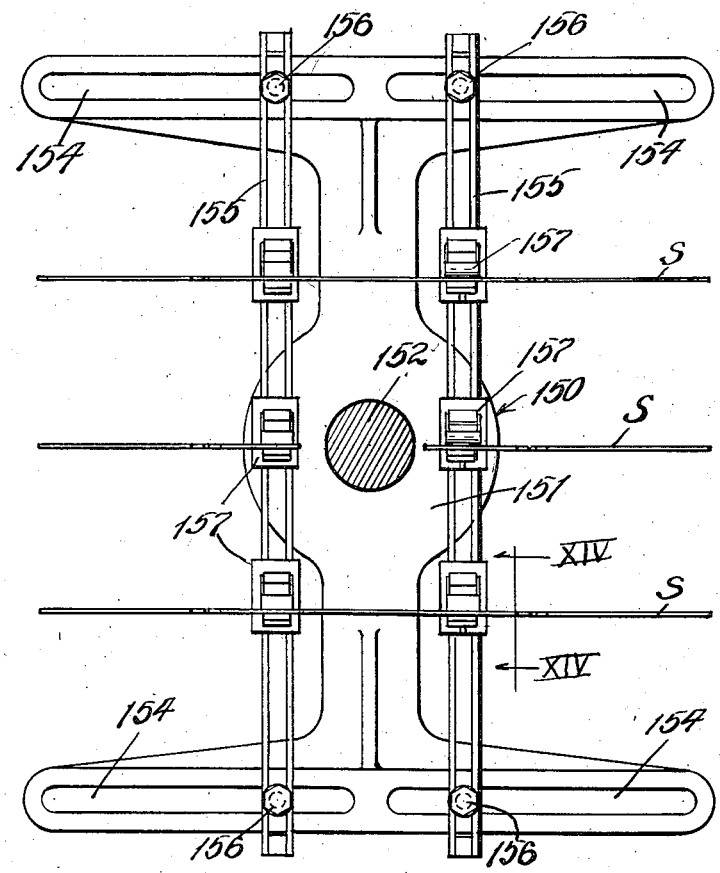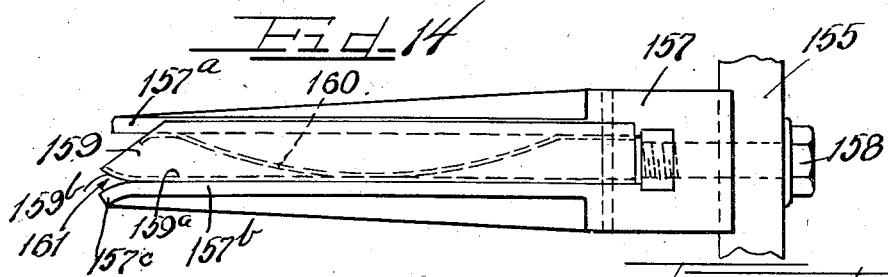

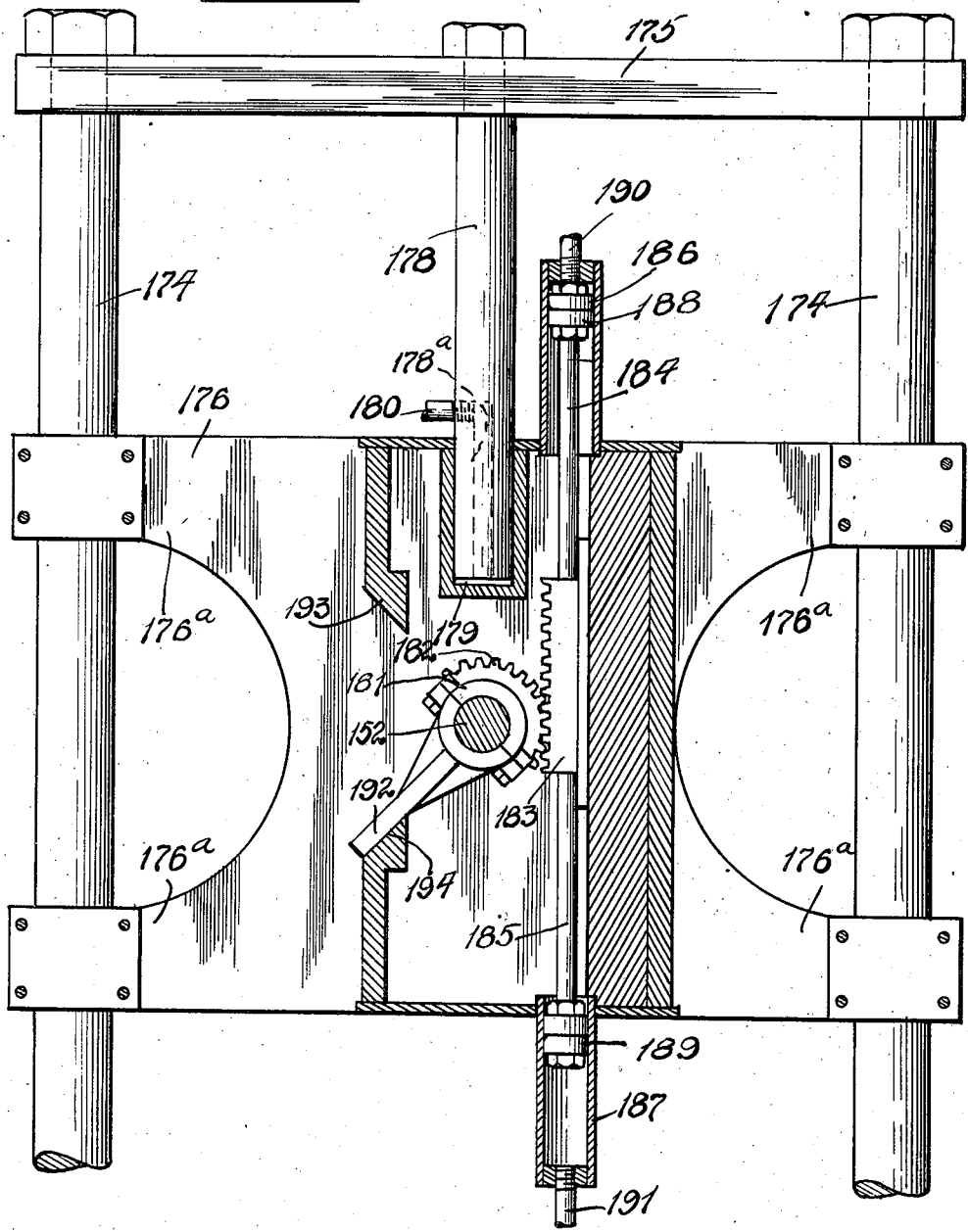

May 19, 1942.  C. J. DELEGARD  2,283,492
CELL CASE MACHINE
Filed Aug. 16, 1939  16 Sheets-Sheet 11

Inventor
Carl J. Delegard

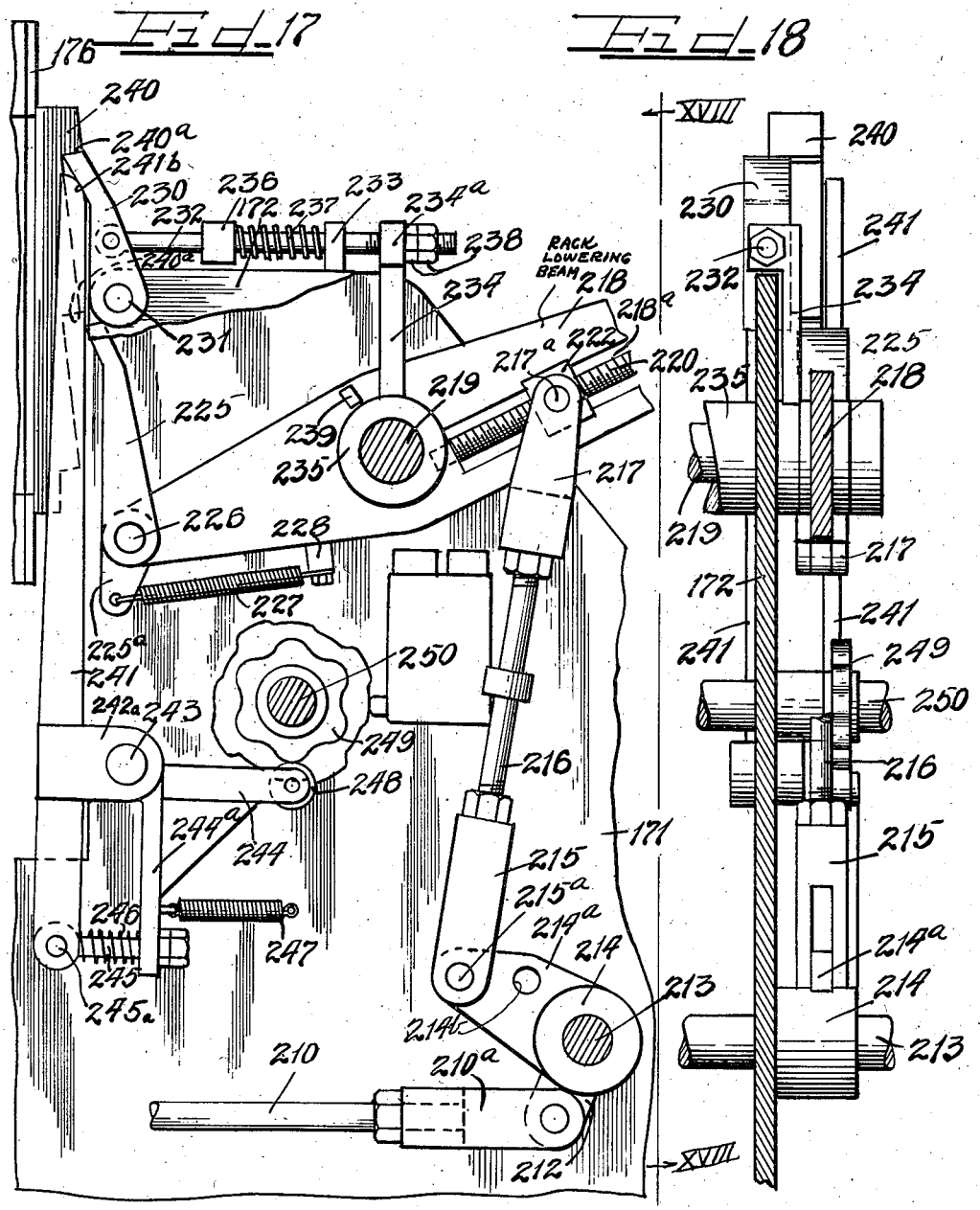

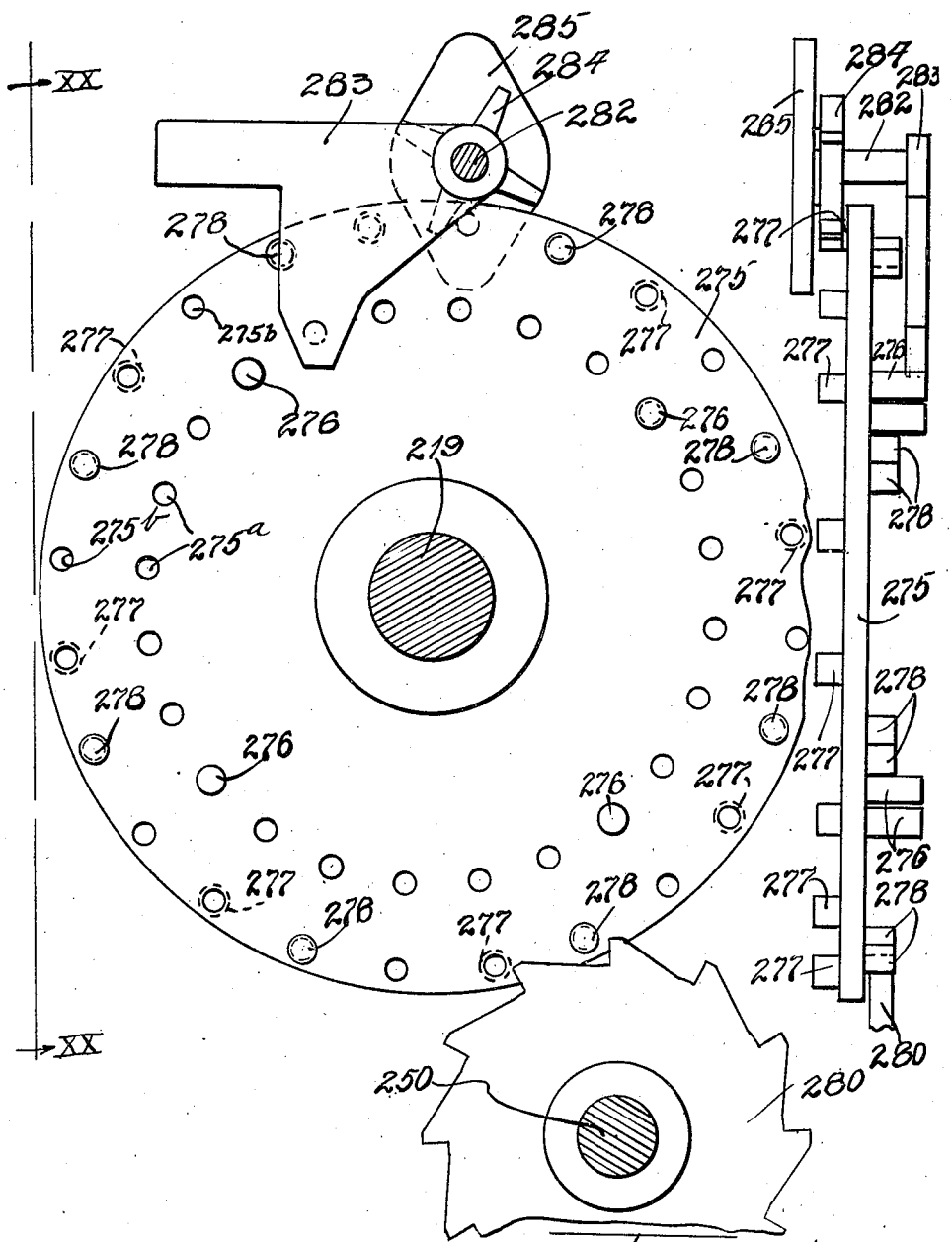

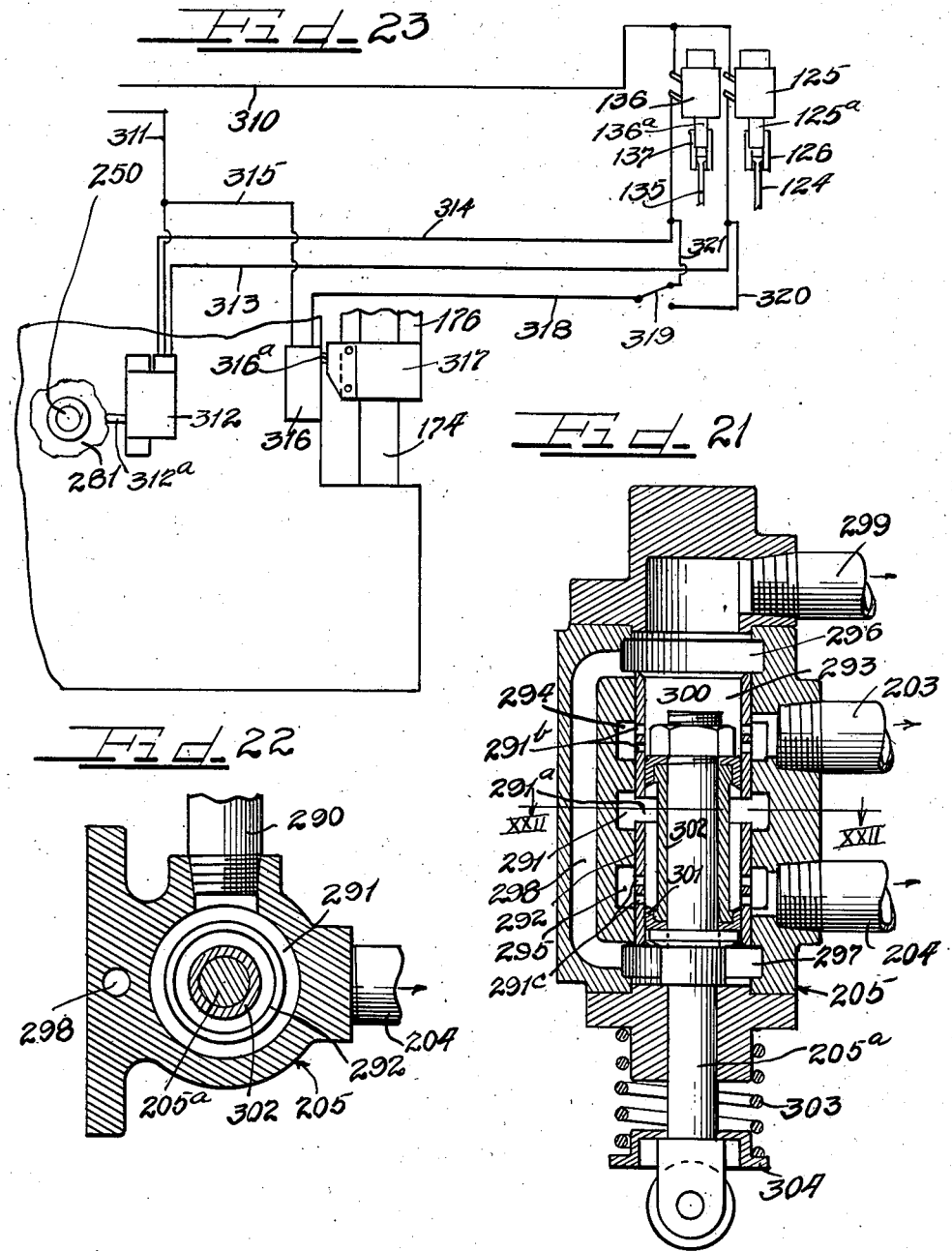

May 19, 1942.　　　C. J. DELEGARD　　　2,283,492
CELL CASE MACHINE
Filed Aug. 16, 1939　　　16 Sheets-Sheet 15
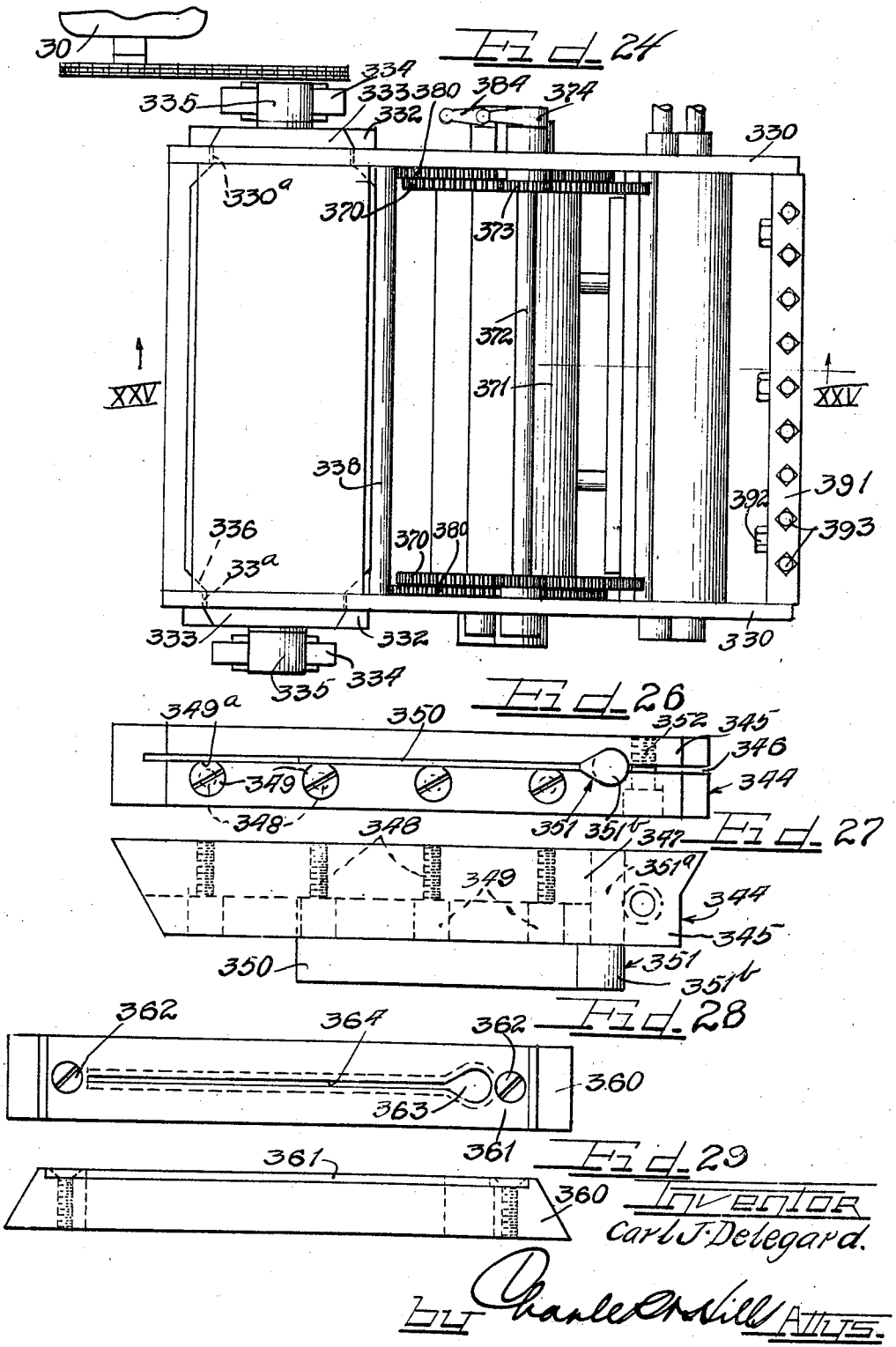

May 19, 1942.  C. J. DELEGARD  2,283,492
CELL CASE MACHINE
Filed Aug. 16, 1939  16 Sheets-Sheet 16
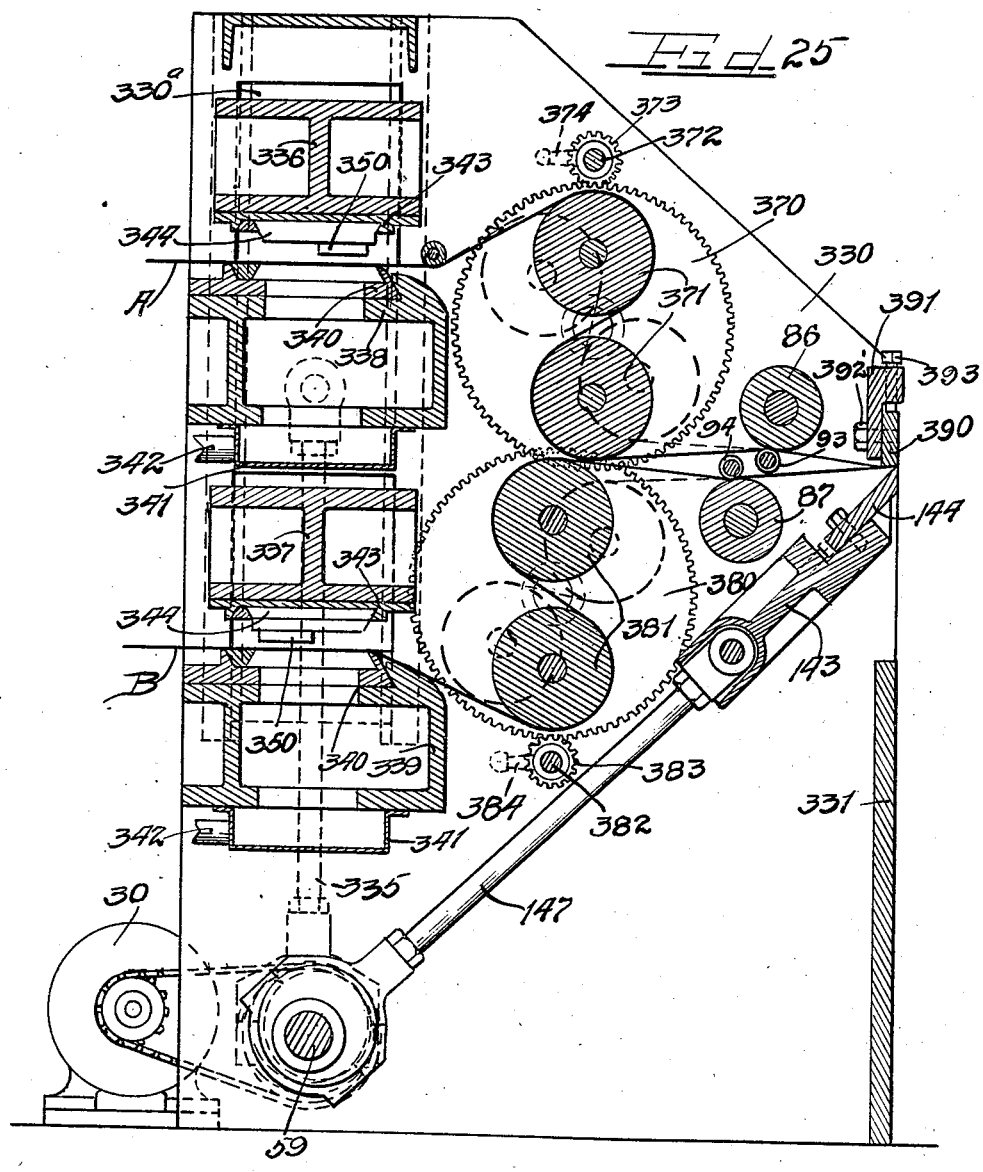

Patented May 19, 1942

2,283,492

UNITED STATES PATENT OFFICE 2,283,492

CELL CASE MACHINE

Carl J. Delegard, Chicago, Ill., assignor to Paper Partitions, Inc., Chicago, Ill., a corporation of Illinois Application August 16, 1939, Serial No. 290,492

28 Claims. (Cl. 93—38)

This invention relates to a machine for forming cell cases or partitions of any desired size.

More specifically, this invention relates to machines which are adjustable throughout a wide range for forming paper webs into cell cases.

The machines of this invention operate on webs of paper without bending or twisting the webs, so that very heavy paper or board can be used.

The machines of the invention automatically punch mating slots in a pair of paper webs, sever the slotted webs transversely into cell case strips, assemble the strips in interlocking relation to form cell cases, and discharge the formed cell cases without, in any way, damaging the paper.

It is an object of this invention to provide cell case machines adapted for receiving webs of paper from rolls to form these webs into cell cases without bending, twisting or damaging the webs.

Another object of the invention is to provide a cell case machine with punches having die holders accommodating rapid replacement of dies.

Another object of the invention is to equip a cell case machine with air blasts or suction means to remove paper punchings produced by the slot-forming punches.

A further object of the invention is to provide web feeding rolls in a cell case machine which have a constant grip on the web fed through the machine.

A further object of the invention is to provide an automatically shifting drive control for the feed rolls of a cell case machine whereby several webs fed to the machine are sequentially moved forward at desired timed increments.

A further object of the invention is to provide a cell case machine with web take-up rolls between the slot-forming punches and the strip-severing dies whereby cell case strips of variable heights can be formed without effecting the spacial relation between the punches and cutters.

Another object of the invention is to provide a cell case machine having a positively operated assembly rack mounted for reciprocal and rotational movement adjacent the strip-severing mechanism of the machine.

A further object of the invention is to provide fluid pressure means in a cell case machine for rotating and retracting the assembly rack thereof.

Another object of the invention is to provide a simplified and readily accessible timing and indexing mechanism for a cell case machine making possible rapid adjustment of the machine to accommodate the production of different sized cell cases.

Other and further objects of this invention will become apparent from the following detailed description of the annexed sheets of drawings, which form a part of this specification.

It should be understood, however, that the drawings merely disclose preferred embodiments of the invention and that many variations in these embodiments may be made without departing from the scope of the invention.

On the drawings:

Figure 1 is a side elevational view of a cell case machine and web unreeling mechanism according to this invention.

Figure 2 is an enlarged cross-sectional view, with parts shown in elevation, taken along the line II—II of Figure 1.

Figure 3 is a perspective view illustrating operation of the punches, feed rolls, cutters and assembly rack of the machine.

Figure 4 is a vertical cross-sectional view of the superimposed male and female punches, taken along the line IV—IV of Figure 3.

Figure 5 is a vertical cross-sectional view taken along the line V—V of Fig. 4.

Figure 6 is a bottom plan view of one of the male punches and holder therefor shown in Figure 4.

Figure 7 is a top plan view of one of the female punches shown in Figure 4.

Figure 8 is an enlarged vertical cross-sectional view taken along the line VIII—VIII of Figure 3.

Figure 9 is a vertical cross-sectional view, with parts in elevation, taken along the line IX—IX of Figure 8.

Figure 10 is a vertical cross-sectional view, with parts in elevation, taken along the line X—X of Figure 9.

Figure 11 is a top plan view, with parts in horizontal cross-section, taken along the line XI—XI of Figure 1.

Figure 11a is a view similar to Figure 11 but with parts omitted and broken away to show the underlying structure and taken along the line XIA—XIA of Figure 16.

Figure 12 is a vertical cross-sectional view, with parts in elevation, taken along the line XII—XII of Figure 11 and illustrating additional parts not shown in Figure 11.

Figure 13 is a vertical cross-sectional view taken along the line XIII—XIII of Figure 12 and illustrating the seating of cell case strips in the fingers.

Figure 14 is an enlarged fragmentary side-elevational view taken along the line XIV—XIV of Figure 13 with the cell case strips omitted.

Figure 15 is a vertical cross-sectional view, with parts in elevation, taken along the line XV—XV of Figure 11.

Figure 17 is a vertical cross-sectional view, with parts broken away and in elevation, taken along the line XVII—XVII of Figure 11.

Figure 18 is a fragmentary side-elevational view, with parts in cross-section, taken along the line XVIII—XVIII of Fig. 17.

Figure 19 is an enlarged detail side-elevational view, with parts in vertical cross-section, taken along the line XIX—XIX of Figure 11.

Figure 20 is a side elevational view taken along the line XX—XX of Figure 19.

Figure 21 is an enlarged vertical cross-sectional view of an air valve taken along the line XXI—XXI of Figure 11.

Figure 22 is a horizontal cross-sectional view of the air valve taken along the line XXII—XXII of Figure 21.

Figure 23 is a wiring diagram for the cell case machine diagrammatically illustrating the electrically controlled parts of the machine.

Figure 24 is a top plan view of a modified embodiment of a portion of the cell case machine.

Figure 25 is a vertical cross-sectional view taken along the line XXV—XXV of Figure 24.

Figure 26 is a bottom plan view of a modified form of male punch and punch holder according to this invention.

Figure 27 is a side elevational view of the punch and punch holder shown in Figure 26.

Figure 28 is a top plan view of a modified female die and holder for cooperating with the male punch shown in Figures 26 and 27.

Figure 29 is a side-elevational view of the female die and die holder shown in Figure 28.

As shown on the drawings:

General outline of the machine

Figure 16:
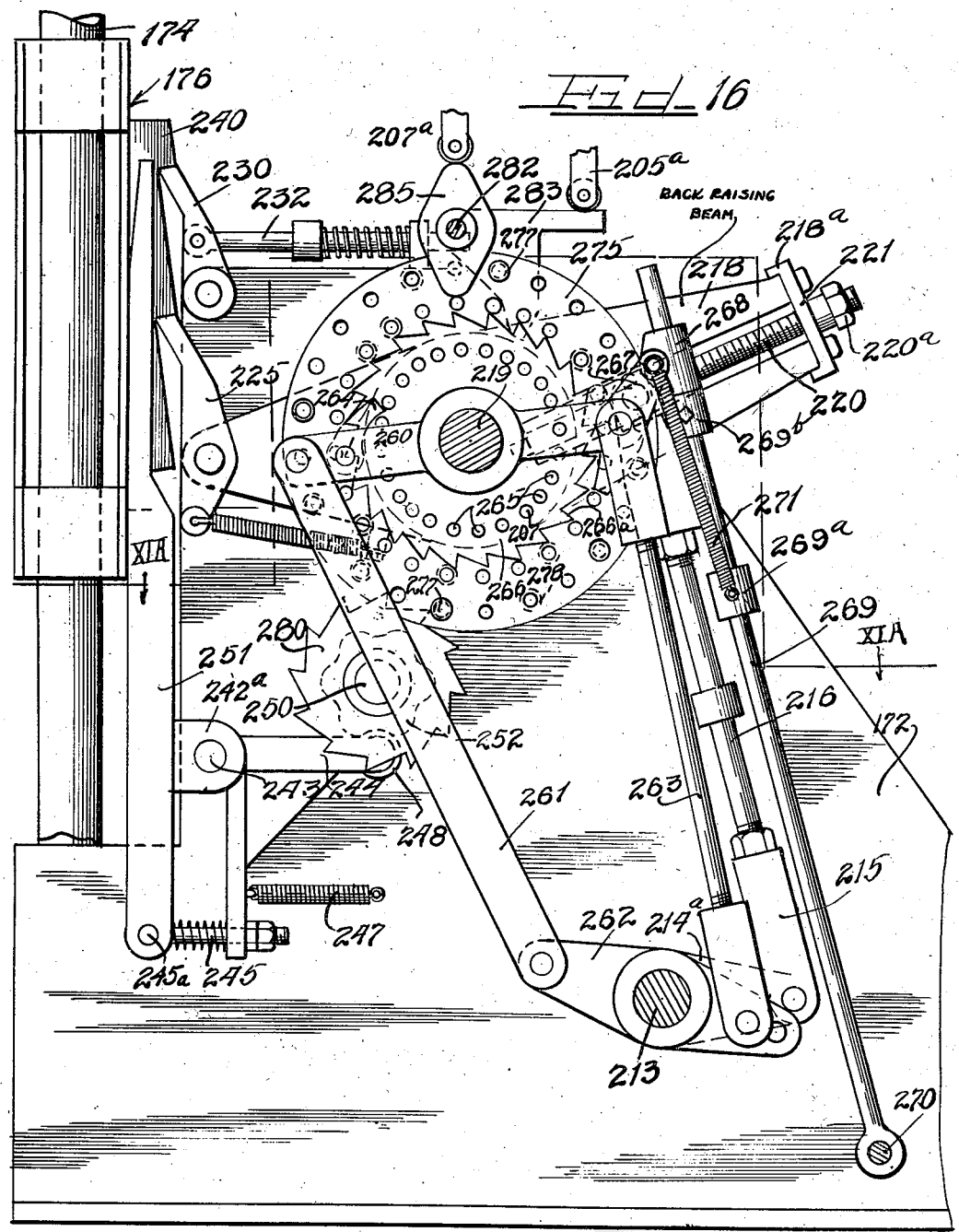
Figure 16 is a vertical cross-sectional view, with parts in elevation, taken along the line XVI—XVI of Figure 11.

As shown in Figure 1 of the drawings, an unreeling device supplies webs of paper A and B in superimposed relation to superimposed feeder trays of the cell case machine from rolls of paper R and R'. The superimposed webs A and B pass under the usual drag blocks in the feeder trays. These drag blocks flatten out the web. If necessary, the edges of the webs can be trimmed by cutters cooperating with the feeder trays. The feeder trays are carried by an auxiliary frame which is swivelly connected to the main frame of the machine.

A punch device is mounted on top of the main frame in an auxiliary frame adapted to be moved longitudinally along the main frame. This punch device has a pair of superimposed slot-cutting punches and cooperating female dies for cutting slots in the webs A and B. The webs A and B are pulled through the punch by feeder rolls located ahead of the punch devices.

A cutter device is also mounted on the main frame of the machine and receives both webs A and B therethrough. This cutter device severs the webs transversely for forming cell case strips therefrom. The cell case strips are seated in an assembly rack mounted in front of the cutter device.

The assembly rack device is carried on an assembly frame and is moved vertically, step by step, in front of the cutter for receiving the cell case strips therein. At the top of its stroke, the assembly rack is rotated 90° and then lowered in its rotated position back in front of the cutters for receiving an additional set of strips in interlocking relation to the first seated set to produce a cell case.

At the bottom of its stroke the assembly rack is retracted through a discharge plate for ejecting the finished cell case therefrom.

The feed rolls are driven intermittently to successively move one web through the machine for forming one set of cell case strips. After this set has been formed, the feed rolls act on the other web to successively seat cell case strips in interlocking relation with the first formed strips.

In the embodiment of the invention shown in Figure 1, the punch frame is movable longitudinally on the main frame of the machine so that any desired spacing between the cutter and the punches can be obtained, thereby making possible the formation of cell case strips of any desired height.

In an embodiment of the invention disclosed in Figures 24 and 25, the punches are in fixed spaced relation from the cutters and web take-up devices are interposed between the punches and cutters for accommodating the formation of cell case strips of different heights.

Since the slots are cut in the webs before the same are severed into strips, and since the machine is widely adjustable so that strips of various heights can be formed, it is necessary that the lengths of the webs between the punches and the cutters be an even multiple of the desired dimensions for the height of the cell case strips.

All parts of the machine are driven from a single drive shaft in proper timed relation. The machine includes an electrical circuit energizing various solenoids and the like for sequentially operating various parts of the machine. The electrical circuit is automatically energized at the proper time by means of cams, tripping devices and the like which are driven from the single main drive shaft of the machine.

A feature of the invention includes the rotation and retraction of the assembly rack by fluid pressure operated pistons which are energized at proper sequential intervals.

The unreeling device

In Figure 1 the reference numeral 10 designates generally an unreeling mechanism for supplying the paper webs A and B in slack condition to the feeder trays of the cell case machine. The unreeling device 10 comprises horizontal longitudinal frame members such as 11 mounted on vertical legs 12. The horizontal frame members such as 11 carry bearing blocks 13 thereon having rollers 13a projecting above the tops thereof. The axles 14 of rolls of paper R and R' have the projecting end portions thereof mounted on the rollers 13a. In this manner the frame rotatably supports two rolls of paper.

A pair of uprights such as 15 is carried by the frame structure between the rolls of paper R and R'. A second pair of uprights such as 16 is also carried by the frame structure between the rolls of paper in spaced relation from the uprights such as 15.

A cross beam 17 bridges the uprights 15 and 16 at one side of the structure at a level above the rolls R and R' but beneath the tops of the uprights. A gear 18 is rotatably mounted on the beam 17 between the uprights 15 and 16.

The pair of uprights 15 rotatably support a roller 19 therebetween in alignment with the beam 17. A gear 20 is secured at one end of the roller and meshes with the gear 18.

A second roller 21 is rotatably mounted between the uprights 15 in spaced relation above the roller 19.

A roller 22 is rotatably mounted between the uprights 16 and has a gear 23 on one end thereof. The uprights 16 also carry another roller 24 therebetween in spaced relation above the roller 22. A gear 25 on the end of the roller 24 meshes with the gear 23 on the end of the roller 22.

A driving pulley 26 which can be mounted on the same shaft carrying the roller 24 and gear 25 is driven through a belt 27 trained around the pulley 26 and around a second pulley 28 driven by the motor 30 for the cell case machine.

Guide rolls 29 and 29a are also mounted in free rotatable relation between the uprights 16 above the pulley 26.

The web of paper A from the roll R is threaded under and around the roll 19 in back of the roll 21 and from the roll 21 over the top of the guide roll 29. The web of paper B from the roll R' is threaded under and around the roll 22, in front of the roll 24 and over and around the guide roll 29a.

The motor 30 drives the pulley 26 to cause rotation of the rollers 19, 22 and 24 through the gear trains. Whenever the feed rolls of the cell case machine draw a web A or B into the machine the slack between the guide rolls and the feeder trays is taken up. The webs are thus drawn either against the roll 19 or the roll 22. Since these rolls are driven, the webs will be unreeled from their rolls R and R'. As soon as a predetermined slack occurs in the lengths of the webs between the guide rolls and the feeder trays, the portions of the webs adjacent the rolls 19 and 22 will be loose, and the rolls will merely slip relative to the paper. When the loose portions of the web are taken up by feed into the cell case machine, the rolls can grab the adjacent web to unreel the same.

From the above description it should be understood that the unreeling device automatically supplies the webs in a slack condition to the cell case machine and can be constantly driven without unreeling an excess of paper from the supply roll since the unreeling will automatically cease whenever a predetermined slack occurs in the unwound portions of the webs.

*The feeder trays*

As also shown in Figure 1, superimposed feeder trays 31 and 32 are carried on an auxiliary frame 33 hinged to the main frame 34 of the cell case machine 35. The main frame 34 is mounted on a bed 36.

The auxiliary frame 33 can be swivelly connected to the main frame 34 through bosses 37 affixed to one side thereof receiving a rod 38 therein. The top end of the rod can carry a boss 39 fixed to the auxiliary frame 33. In this manner the frame 33 can be swung about the rod 38 to move the feeder trays away from the inlet end of the cell case machine 35.

Each feeder tray 31 and 32 has a drag block 40 therein. The webs of paper A and B are directed over the feeder trays 31 and 32 respectively and under the drag blocks 40. The drag blocks will flatten out the webs to feed the same in a horizontal position into the cell case machine.

If desired to slit the webs A and B longitudinally, or to trim the edges of the webs, the auxiliary frame 33 can carry rollers 41 ahead of the feeder trays 31 and 32 receiving the webs A and B thereunder. Cutting discs such as 42 can be rotatably mounted under the webs A and B and coact with the rollers 41 for slitting the webs or trimming the edges of the webs. These cutting discs 42 can be rotatably mounted on the ends of arms 43 which are carried by shafts 44 extending under the feeder trays and receiving worm wheels 45 on one end thereof operated by worms 46 on the shafts 47 of hand wheels 48. Rotation of the hand wheels will turn the shaft 44 to move the cutting discs 42 into or out of engagement with the webs.

A plurality of cutting wheels 42 can be mounted for independent movement on each shaft 44 so that some of the wheels can be spaced from the web even when the hand wheels 48 are operated to move other of the cutting wheels into contact with the webs.

*The punch press mechanism*

The punch press mechanism is mounted in a frame structure 50 which is slidable on top of the main frame 34 of the machine. The frame 50 includes side frame plates 50a and shaft members 51 between the side frame plates on each side of the cell case machine.

Superimposed male punch carriers 52 and 53 extend transversely between the side frame plates 50a and are slidably mounted at their ends on the shafts 51. Sleeves 54 connect the punch carriers 52 and 53 and are disposed around the shaft.

The sleeves 54 have horizontal housing members 55 formed thereon and projecting beyond the side frame plates 50a. Crossheads such as 56 are slidably mounted in the housing 55 and are pivotally connected to driving rods 57. The driving rods 57 are connected to eccentrics 58 driven by the main drive shaft 59 of the machine. The crossheads 56 permit a sliding of the auxiliary frame 50 on the main frame 34 to adjust the spacing of punches from the strip severing cutters for a purpose to be hereinafter more fully described.

As shown in Figures 2 and 3, pairs of superimposed transverse beams 60 and 61 extend between the frame members 50a beneath the male die carriers 52 and 53. Female dies 62 and 63 bridge the beams 60 and 61 respectively.

As shown in Figure 4, the male die carrier plates 52 and 53 are provided with dovetailed recesses 52a and 53a respectively. Male die holders 64 and 65 are seated in the recesses and locked therein by means of wedges 66 and 67. The wedges are held in the carriers 52 and 53 by means of bolts such as 68.

As shown in Figures 5 and 6, the die carriers such as the die carriers 64 are provided with longitudinal slots 69 and spaced transverse threaded bores 70 having enlarged countersunk end portions 70a communicating with one side of the carrier.

The carriers 64 are also formed with triangular-shaped vertical recesses 71.

Triangular punches 72 are seatable in the recesses 71 and project from the bottoms of the carriers as shown in Figure 5. The apex of the triangular punch registers with the slot 69. A knife 73 is seated in the slot 69 in abutting relation with the apex of the triangular punch 72.

Screws 74 are threaded in the bores 70 and extend through holes in the knife 73. The heads 74a of the screws 74 fit in the countersunk portions 70a of the bores. A tightening of the screws will decrease the width of the slot 69 to clamp the knife 73 and the punch 72 therein. As shown in Figures 4 and 5, the triangular punch 74 and the knife 73 extend from the bottoms of the die carriers 64 and 65. Since the knives are separate from the punches, knives of different lengths can be used to cut variable lengthed slots in the webs A and B.

As best shown in Figures 4, 5 and 6, the female dies 62 and 63 bridge the beams 60 and 61 respectively and are held on the beams in aligned relation beneath the male dies by means of screws 75. The female dies have longitudinal slots 76 extending therethrough terminating at one end in a triangular-shaped aperture 77 for receiving the knives 73 and punches 72 respectively therethrough.

As best shown in Figure 3, the web A passes over the female dies 62 and under the top male die carrier 64 carrying the slot-cutting knives 73 and triangular punches 74. When the member 52 is actuated to move the punches and knives into the female dies 62, longitudinal slots 78 will be cut in the web A at spaced intervals across the width of the web. These slots will terminate at their rear ends in triangular-shaped apertures 78a.

The web B passes over the female dies 63 and under the male dies carried by the punch heads 53. When the punch head is actuated, longitudinal slots 79 will be cut in the web B at spaced intervals across its width and these slots 79 terminate at their leading ends in triangular apertures 79a.

It should be noted from Figure 4 that the punches 74 are aligned vertically so that the apertures 78a and 79a cut in the webs will be in mating relation.

Slotted suction ducts 80 (Figures 1 to 3) are disposed transversely over the webs A and B in front of the punches. These air ducts are subject to suction exerted therethrough from a suction fan 81 (Figure 2) driven by the motor of the machine. The punchings are thus drawn out of the slots in the webs into the ducts.

The feed roll mechanism

As shown in Figures 1, 8 and 9, an auxiliary frame structure, composed of side plates 82, roll supporting heads 82a, inner side plates 83, and a top side plate 83a, is also mounted on the main frame 34 of the cell case machine. This auxiliary frame structure is disposed in longitudinal spaced relation from the frame structure 50 carrying the punches.

As best shown in Figure 8, axle shafts 84 and 85 extend in superimposed relation transversely across the machine between the frame heads 82a. Feed rolls 86 and 87 are keyed on the shafts 84 and 85 respectively between the frame heads 82a. A bar 88 is pivotally mounted on the inner face of each frame head 82a on a pivot pin or bolt 90. A second bar 89 is similarly mounted on each head 82a beneath the bars 88. The bars 89 are pivoted on pins or bolts 91. A coil spring 92 urges the free ends of the bars apart.

A gripping roll 93 is rotatably carried by the top pair of bars 88 and extends beneath the feed roll 86 for urging the web A against the feed roll. A second gripping roll 94 is rotatably carried at its ends by the bars 89. This gripping roll 94 is disposed above the feed roll 87 and is urged against the feed roll by the spring 92 to hold the web B against the feed roll.

The webs A and B are therefore in constant contact with their respective feed rolls, so that whenever the feed rolls are driven, the webs will be moved.

The drive mechanism for feed rolls

As best shown in Figure 9, a sleeve 95 is rotatably mounted around the outer end of the shaft 84. This sleeve 95 projects on both sides of the frame plate 82 and has a radially extending arm portion 95a on its inner end.

A lever 96 is pivotally mounted at one end on the outer end of the arm 95a by means of a bolt 97. A coiled spring 98 urges the free end of the lever 96 inwardly toward the shaft 84.

As also shown in Figure 9, the lever member 96 has a pawl portion 96a disposed inwardly of the arm 95a. A wheel 99 having a beveled periphery 99a is rotatably mounted on the free end of the lever 96 around a bolt 100 extending through the free end of the lever.

A gear 101 is keyed to the sleeve 95 on the outside of the frame plate 82. As shown in Figure 1, the gear 101 meshes with a rack bar 102 held in meshing relation therewith by means of a strap 103. The rack bar 102 is pivoted at its lower end to a slidable crosshead 103 mounted in the channel 104 of a reciprocating drive member 105. The drive member 105 is pivoted at one corner to the main frame 34 by means of a pin 106 and is oscillated about this pin through an eccentric connection 107 with the main drive shaft 59 of the machine. In this manner the rack bar 102 is reciprocated to drive the gear 101 forward and backward an amount determined by the eccentric throw of the crosshead 103. Since the crosshead 103 can be adjusted toward and away from the center of the driving member 105, the amount of driving of the gear 101 can be determined by the position of this crosshead.

The sleeve 95, as shown in Figure 9, has a second gear 108 keyed thereon inside of the frame plate 82. This gear 108 meshes with a gear 109 keyed to a sleeve 110 which is freely rotatable on the shaft 85 for the lower feed roll 87. The sleeve 110 has a radially extending arm portion 110a similar to the arm portion 95a and the outer end of this arm 110a pivotally supports one end of a lever 111. A bolt 112 mounts the lever 111 on the arm 110a and has a coiled spring 113 urging the free end of the lever toward the shaft 85. A pawl portion 111a is formed on the lever 111 inwardly of the arm 110a and a wheel 114 having a beveled periphery 114 is rotatably mounted on the free end of the arm by means of a bolt 115.

A second sleeve 116 is disposed around the shaft 84 inwardly of the sleeve 95 but, unlike the sleeve 95, it is keyed directly to the shaft. The sleeve 116 has a ratchet gear 117 formed thereon. A disc 118 is disposed around the sleeve 116 in slidable relation thereto but is keyed against rotation relative to the sleeve by means of a key 119. The disc 118 has a beveled periphery 118a adapted to contact the periphery 99a of the wheel 99 as will be hereinafter described.

The disc 118 also has a boss portion 118b disposed around the sleeve 116 and provided with a circumferential groove 118c.

A rock shaft 120 is rotatably mounted in brackets or lugs such as 121 projecting outwardly from the frame plate 83. Arms 122 are mounted on the rock shaft 120 and have pins 123 on their free ends engaged in the groove 118c.

As shown in Figure 8, one end of the rock shaft 120 is connected to an arm 124. The frame structure 83a carries a solenoid 125 having the core 125a thereof connected through a link 126 to the arm 124. Operation of the solenoid moves the core 125 thereof to oscillate the rock shaft 120 thus moving the free ends of the arms 122 toward and away from the frame plate 83. This of course slides the disc 118 into and out of contact with the roller 99 to move the pawl 96a of the lever 96 into and out of engagement with the ratchet gear 117.

As the gear 101 is oscillated by the rack bar 102, the sleeve 95 oscillates the arm 95a thereof about the gear 117. If the disc 118 is disengaged from the wheel 99, the pawl 96a can engage the gear 117 on the forward stroke of the arm 95. This will move the sleeve 116 forwardly and in turn will drive the shaft 84 to rotate the feed roll 86.

Oscillation of the sleeve 95 also oscillates the gear 108 to drive the gear 109 meshing therewith and to turn the sleeve 110 keyed to the gear. The arm 110a moves the pawl 111a of the lever 111 over a ratchet gear 127 similar to the ratchet gear 117. The ratchet gear 127 is formed on the sleeve 128 which is keyed to the shaft 85 for the lower feed roll 87. A disc 129 has the boss portion 129b thereof slidable on the sleeve but keyed thereon against rotation by means of a key 130. The boss 129b is circumferentially grooved as at 129c. The periphery of the disc 129 is beveled as at 129a to mate with the beveled periphery 114a of the wheel 114.

A second rock shaft 131 is rotatably mounted in lugs or brackets 132 formed on the frame plate 83. This rock shaft 131 carries arms 133 having pins 134 engageable in the groove 129c.

As shown in Figure 8, one end of the rock shaft 131 receives an arm 135. A second solenoid 136 is mounted on the frame 83a and has the core 136a thereof connected through a link 137 to the arm 135. Operation of the solenoid 136 slides the disc 129 toward and away from the wheel 114 to lift the pawl 111a off of the ratchet gear 127 or to permit engagement of the pawl with the gear.

Proper timed electrical impulses to the solenoids 125 and 136, as will be more fully hereinafter described, causes disengagement of the feed rolls 86 and 87 in proper timed sequence while the throw of the rack bar 102 determines the forward movement of the feed rolls. As the rack bar is returned to driving position, the pawls click over the ratchet wheels and do not move the feed rolls backward.

The strip-severing mechanism

As best shown in Figures 3 and 8, the webs A and B are pushed forwardly by the feed rolls 86 and 87 between horizontal guide plates 139 extending transversely across the space between the frame heads 82a.

The frame heads 82a support a stationary cutter bar carrier 140 inclined at about a 45° angle to the top guide plate 139. The carrier 140 supports a stationary cutting knife 141 having the cutting edge 141a thereof disposed in front of the guide plates 139. The cutting knife 141 is held on the carrier 140 by means of bolts 142.

The frame heads 82a slidably support, on inclined ways, a movable carrier 143 operating at about a 45° angle to the guide plates 139 beneath the lower web B. The carrier 143 supports a cutter bar 144 having the cutting edge 144a thereof adapted to project beyond the cutting edge 141a of the stationary bar 141 for severing whichever of the webs project beyond the stationary cutting edge. Bolts 145 secure the cutter 144 to the carrier. Adjustment of the cutting edge 144a of the cutter is made by adjusting screws such as 146 adapted to abut the rear end of the cutter. The screws are threaded to the carrier as shown in Figure 8.

A drive rod 147 is pivoted to the lower end of the carrier 143 and is driven from an eccentric disc on the main drive shaft 59 of the cell case machine.

The feed rolls advance one of the webs A or B a desired distance beyond the cutting edge 141a of the stationary cutter 141. The movable cutter then severs the web transversely across the width into a cell case strip, the height of which is determined by the portion of the web which projects beyond the stationary cutter. The same cutter acts on both webs, but since the feed rolls are alternately driven, only one web at a time will be severed into cell case strips.

The assembly rack

As best shown in Figures 1, 3, 12 and 13, the reference numeral 150 designates generally an assembly rack for receiving strips severed from the webs A and B. This assembly rack comprises an H-shaped plate 151 slidably mounted on a rod 152 but keyed against rotation relative to the rod by means of a key 153 (Figure 12).

As best shown in Figure 13, the top and bottom legs of the plate 151 are longitudinally slotted as at 154. Channel strips 155 extend across the front of the plate 151 and are secured at their ends by bolts 156 which extend through the slots 154. These channel strips 155 are thus adjustable in the slots 154.

Each channel strip 155 supports a plurality of fingers 157 in spaced relation along the length thereof. The fingers 157 project horizontally from the plate 151 toward the cutters, as shown in Figure 3. Each finger 157 is adjustable along the length of its supporting channel strip 155 and is held in adjusted position by a bolt 158 as shown in Figure 14.

Each finger 157 includes a top lip 157a and a bottom lip 157b spaced beneath the top lip.

A U-shaped metal plate 159 has the side walls thereof disposed on each side of the top lip 157 and the base 159a thereof is adapted to rest on the bottom lip 157b. A spring 160 is mounted between the side walls of the plate 159 and is held under compression between the bottom wall 159a thereof and the finger 157a. This spring thus urges the plate 159 against the bottom lip 157b of the finger. As best shown in Figure 14, the bottom front end of the plate 159 is turned up as at 159b while the front end of the finger 157b is turned down as at 157c to provide a gap 161 adapted to receive the leading edge of a web A or B projecting from the cutter. As the feed rolls push this leading edge forwardly toward the plate 151, the web will slide between the lip 157b and the bottom 159a of the spring-pressed plate to be received and held by the finger 157.

As shown in Figure 13, the strips S are thus held in spaced horizontal relation in front of the cutters.

A plate 162 is mounted on the outer end of the rod 152 in front of the plate 151. This plate 162 has slots or apertures 163 (Figure 3) therethrough permitting the fingers 157 to project beyond the plate toward the cutters.

Assembly rack mounting structure

As shown in Figure 1, an assembly frame 170 is mounted on the bed 36 of the cell case machine in spaced relation from the main frame 34. The assembly frame 170, as best shown in Figures 11 and 11a, comprises vertical side plates 171, spaced webs or plates 172 between the plates 171, a rear plate 173, a pair of posts 174 projecting vertically upward from blocks 171a on the front end of the plates 171 on each side of the machine and a cross beam 175 connecting the tops of the posts 174.

As best shown in Figures 1, 3, 11 and 15, a carriage 176 is provided with spaced arm plates 176a at the four corners thereof receiving bearing blocks 177 therebetween slidable on the posts 174. The carriage 176 is thus mounted for vertical movement on the posts.

As shown in Figure 15, the cross beam 175 supports a rod 178 between the posts 174. This rod 178 is adapted to seat in a well 179 of the carriage 176. A bore 178a in the rod 178 communicates with the end of the rod for supplying air or other fluid under pressure to the well 179. A tube 180 can be threaded in the rod 178 to communicate with the bore 178a thereof for supplying the fluid under pressure to the well. This arrangement permits vertical movement of the carriage since the well portion 179 thereof will slide on the rod 178 but at the same time the fluid trapped on the well beneath the rod will prevent the carriage from bouncing since there is always a down pressure acting against the carriage.

As shown in Figures 3 and 12, the shaft 152 which slidably receives the assembly rack in front of the carriage 176 is mounted at its rear end in the carriage. A sleeve 181 is disposed around the shaft 152 between the side plates of the carriage and, as shown in Figure 15, one portion of this sleeve has an arcuate gear 182 thereon meshing with a vertical rack bar 183 carried by piston rods 184 and 185. The piston rods are slidable into and out of air cylinders 186 and 187 respectively and receive piston heads 188 and 189 respectively slidable in the cylinders. Air is admitted to the cylinders through flexible tubes 190 and 191.

The sleeve 181 also has a tail member 192 projecting from the side thereof opposite the gear 182. This tail 192 is adapted to strike against abutments 193 and 194 provided on the carriage.

When air is supplied to the cylinder 186 the piston therein is forced downwardly to move the rack bar downwardly. This, of course, turns the shaft 152 and rotates the assembly rack through 90° since the abutments 193 and 194 will prevent further rotation of the shaft. Likewise when air is supplied to the cylinder 187 the rack bar will be raised to rotate the shaft back through a 90° angle for returning the assembly rack to its initial position.

As shown in Figures 3 and 12, a pair of rods 195 extends rearwardly from the back wall of the carriage and carry a plate 196 at their rear ends. A cylinder 197 is mounted between the plate 196 and the rear wall of the carriage and has a piston 198 slidable therein. This piston is thus movable in a horizontal position behind the carriage.

A piston rod 199 projects from the piston 198 through the rear plate 196 and receives a plate 200 at its rear end. The plate 200 is secured to a pair of rods 201 extending forwardly from the plate through the plate 196 and through the carriage 176 to a collar 202 rotatably mounted on the boss portion 151a of the plate 151 in an annular groove in front of the carriage 176 but behind the assembly plate 151.

As best shown in Figure 11, the end of the cylinder 197 adjacent the carriage 176 receives air under pressure through a flexible tube 203 while the rear end of the cylinder receives air through a flexible tube 204. The tubes 203 and 204 communicate with an air valve 205. The piston in the cylinder 197 is thus moved toward and away from the carriage to carry the plate 200 toward and away from the plate 196. The rods 201, in turn, are reciprocated to move the collar 202 toward and away from the carriage 176. The collar 202 is held in the groove on the boss 151a which is part of the assembly rack 150 and carries the rack along the shaft 152. The assembly rack can thus be retracted from the position shown in Figure 3 wherein the fingers project beyond the plate 162 to the position shown in Figure 12, wherein the fingers are retracted from the plate 162. As a result of this movement the finished cell case C is discharged from the fingers onto a conveyor belt 206 extending transversely across the machine under the assembly rack.

As also shown in Figure 11, the tubes 190 and 191 from the cylinders 186 and 187 respectively communicate with an air valve 207.

The assembly rack is thus mounted for vertical movement along the posts 174, is also mounted for rotational movement throughout a 90° turn and is mounted for horizontal movement toward and away from the discharge plate 162.

Raising and lowering mechanism for the assembly rack

As shown in Figures 1 and 11, a rod 210 is oscillated axially from the main drive shaft 59 of the cell case machine by means of an eccentric mounting 211 thereon. This rod 210 has a clevis 210a on the rear end thereof pinned to an arm 212 which is keyed on a cross-shaft 213 extending transversely between the side plates 171 of the assembly frame as shown in Figures 11 and 11a. This cross-shaft 213 is thus rocked by the rod 210.

As shown in Figures 11, 11a and 17, bosses 214 are mounted on the shaft 213 adjacent the outer sides of each frame plate 172. These bosses 214 have integral arm portions 214a which are pinned to clevises 215 by means of pins 215a. The arms 214a can have a plurality of apertures 214b therein to provide different mountings for the clevises 215.

As shown in Figures 11, 11a, 17 and 18, each clevis 215 is secured to a rod 216 having the second clevis 217 at the other end thereof. The clevis 217 straddles an assembly rack lowering beam 218 rotatably mounted on a shaft 219 carried by the frame plates 172. The beam 218 is slotted as at 218a, and a threaded rod 220 is rotatably mounted in the slot. As shown in Figure 16, the rod 220 extends through a plate 221 bolted on the end of the beam 218 and has a head 220a on the end thereof. A block 222 is threaded on the rod and is slidable in the slot 218a (Figure 17). This block 222 is pinned to the clevis 217 by means of pins such as 217a.

A rotation of the rod will thus move the block 222 in the slot 218a to vary the distance between the pivotal connection of the rod 216 with the beam and the shaft 219 on which the beam is mounted. The beam 218 is thus oscillated about the shaft 219.

As shown in Figure 17, the front end of the beam 218 carries an upwardly projecting finger 225 provided with a clevis bottom straddling the beam. A pin 226 pivotally supports the finger on the end of the beam. A tail 225a depends from the finger 225 beneath the beam 218 and receives one end of a coil spring 227. The other end of the coil spring is anchored to a lug 228 depending from the beam. The top end of the finger 225 is thus urged forwardly for a purpose to be hereinafter described.

The intermediate frame plates 172 have fingers 230 pivoted to the tops thereof by means of pivot pins 231, as shown in Figures 11 and 17. Rods 232 are pivoted to the fingers 230 above the pivot pins 231 and these rods are slidable through lugs 233 projecting upwardly from the frame plates 172. As best shown in Figure 17, the rear end of the rod 232 is slidable through the eye end 234a of an arm 234 projecting upwardly from a sleeve 235 carried by the shaft 219 adjacent the bead 218.

An abutment block 236 is provided on the rod 232 in front of the lug 233. A coiled spring 237 is held under compression between the block 236 and the lug 233. The rear end of the rod 232 is threaded and receives nuts 238 thereon preventing withdrawal of the rod through the eye end 234a of the arm member 234. The springs 237 urge the rods and fingers 230 forwardly for a purpose to be hereinafter described.

An abutment 239 is formed on the assembly rack lowering beam 218 and is adapted to strike the arm 234 for retracting the finger 232 from its spring-urged forward position. It should be understood that the beam 218 and finger constructions 225 and 230 are duplicated adjacent each frame plate 172, as shown in Figure 11. However, the rack raising beam 218 as shown in Figure 16 does not have the abutment 239 for operating the adjacent rod 232 and finger 230.

As shown in Figures 11, 17 and 18, toothed bars 240 are secured on the rear side of the carriage 176 for cooperating with the fingers 225 and 230. The teeth 240a on these bars are in spaced vertical relation and are adapted to abut against the tops of the fingers 225 and 230. Retractor levers 241 are provided on each side of the rack bar 240 which is acted on by the rack lowering beam 218, as shown in Figures 17 and 18. Each ejector bar is only aligned with a single finger 225 or 230.

As shown in Figures 11a and 17, the ejector bars 241 are secured, near their bottom ends, to the arms 242a of the sleeves 242 rotatable on a shaft 243. A bell crank 244 is rotatable on the shaft 243 adjacent each sleeve 242. The vertical leg 244a of the bell crank 244 extends downwardly to the bottom of the adjacent bar 241 and receives a bolt 245 therethrough which is swiveled to a pin 245a extending through the bottom of the bar. A coiled spring 246 is held under compression between the bar 241 and the leg 244a. A second coiled spring 247 is secured at one end to the vertical leg 244a of the bell crank and at the other end to the frame plate 172. The coiled springs 246 and 247 urge the bell crank 244 upwardly about the shaft 243.

The horizontal leg 244b of the bell crank 244 carries a roller 248 adapted to ride on a cam 249 carried by a shaft 250. As the roller rides over the high spots of the cam 249, the bell crank 244 is pivoted downwardly to compress the spring 246 and pivot the ejector bar 241 about its shaft 243. A second cam 249 on the shaft 250 operates the other bell crank 244 to actuate the adjacent ejector bar.

With the assembly rack carriage 176 in elevated position, the rack lowering beam 218 is oscillated to move the finger 225 to the top of its stroke. During this raising operation, the wheel 248 is on a high spot of the cam 249 so that the ejector bar 241 holds the finger 225 away from the teeth 240a of the rack bar 240. As shown in Figure 17, however, the top end of the ejector bar 241 is beveled as at 241a so that it will not completely disengage the finger 230 from a tooth 240a of the rack bar. As the lowering beam 218 reaches the top of its stroke, the roller 248 is on a low portion of the cam 249 so that the springs 246 and 247 can pull the ejector bar 241 away from the finger 225 and allow this finger to engage a tooth 240a of the rack bar. The lug 239 of the lowering beam 218 then strikes the arm 234 to retract the finger 230 from the engaged tooth on the rack bar, and the rack bar then rides downwardly with the finger 225 on the down stroke of the lowering beam. The beveled end 241a of the ejector bar 241 serves to move the finger 230 slightly for upward action against the tooth 240a, so as to free the finger 225 from the tooth engaged thereby. The ejector bar 241 can then remove the finger 225 from alignment with the tooth, without dragging the finger along the tooth surface.

The rack raising beam 218, as shown in Figure 16, is identical with the rack lowering beam 218, except that the abutment 239 is omitted, and the rod 232 controlling the finger 230 is not retracted by the beam. As shown in Figure 11, two sets of rack bars 240 are used. The rack bar 240 on the right cooperates with the lowering beam 218, best shown in Figures 17 and 18, and the one on the left cooperates with the raising beam 218, best shown in Figure 16.

The left-hand rack bar 240 has ejector bars 251 on each side thereof mounted on a shaft 243 in the same manner as the rack bars 241 described in connection with Figure 17. Identical reference numerals have been used on Figure 16 to designate this mounting structure. The rollers 248 for the bell cranks operating the ejector bars 251, however, ride on cams 252 carried on the same shaft 250 as the cams 249. The ejector bars 251 extend above the top of the finger 230 on the rack raising beam 218, whereas the ejector bars 241 terminate below the top of the finger 230 on the rack lowering beam 218.

When the carriage 176 is in its lowermost position and the raising beam 218 is oscillated to carry the finger 225 upwardly, the ejector bars 251 are in a retracted position, since the rollers 249 will be riding on low spots of the cams 252. The finger 225 will then raise the rack bar 241 an amount determined by the upward throw of the raising beam 218. When the finger 225 starts to descend, the finger 230 holds the rack bar and carriage against a lowering action and the finger 225 can ride downwardly into engagement with the next lower tooth on the rack bar.

During this raising operation of the carriage, the ejector bars 241 hold the fingers on the right side of the machine away from their cooperating rack bar. Likewise, when the carriage reaches the top of its stroke and the fingers on the right side of the machine are brought into operation for lowering the carriage step by step, the ejector bars 251 hold the fingers on the left side of the machine out of their engagement with their rack bar.

The assembly rack is thus moved upwardly step by step by the finger 225 on the left side of the machine carried by the rack raising beam 218. The superimposed locking finger 230 holds the assembly rack in its raised position during the descending stroke of the finger 225.

When the assembly rack reaches the top of its stroke it is lowered step by step by the finger 225 on the right side of the machine carried by the rack lowering beam 218. The finger 230 superimposed above the rack lowering beam operates to hold the assembly rack in its lowered position while the lowering beam is carrying the finger 225 upwardly for engagement with a higher tooth on the rack bar 240 and the ejector bars 241 are operative to prevent engagement of this finger 225 with the rack bar until it has reached the desired next higher tooth of the rack bar.

Alternatively the cams 249 and bell cranks 244 operated thereby can be dispensed with. In addition, the ejector bar 241 acting on the finger 230 cooperating with the lowering cam 218 can be dispensed with. Thus, the other ejector bar 241 operating on the pawl 225 need be the only ejector bar cooperating with the rack lowering beam. In this alternative modification the single bar 241 would have a spring constantly pulling it against the pawl 225. The pawl 225 would therefore be forced out of line away from the tooth 240a on the adjacent rack bar 240.

However, in this alternative modification, as the lowering beam reaches the top of its stroke, the pawl 225 slides over the rounded or beveled top 241b of the bar 241 and engages a tooth 240a. A slight further raising of the lowering beam 218 will then take the load off of the stop pawl 230. The abutment 239 on the lowering beam 218 will then move the arm 234 to retract the pawl 230 from the tooth 240a engaged thereby. The carriage structure 176 will thus ride downwardly on the lowering structure of the lowering beam 218. When the pawl 225 is carrying the load of the carriage, the spring pressure on the ejector bar 241 is not sufficient to disengage the pawl from the tooth of the rack bar. However, when the stop pawl 230 engages the next higher tooth 240a and the load is taken off of the pawl 225, the spring will pull the ejector bar 241 to disengage the pawl 225.

*Indexing mechanism for the machine*

As shown in Figures 11, 11a and 16, a walker beam 260 is freely mounted on the same shaft 219 carrying the raising and lowering beams 218. The forward end of the walker beam 260 is pivoted to a bar 261. The lower end of the bar 261 is pivoted to an arm 262 keyed to the drive shaft 213. The rear end of the walker beam 260 is pivoted to a rod 263 which is also pivoted at its lower end to the same arm 262. The walker beam 260 is thus oscillated with the oscillation of the drive shaft 213.

A pawl 264 is pivoted on the walker beam 260 adjacent the bar 261. The pawl 264 is adapted to engage pins 265 extending from the side of the ratchet gear 266 keyed to the shaft 219.

A second pawl 267 is pivoted to the other end of the walker beam 260 intermediate its ends and is adapted to engage at one end thereof with the teeth 266a of the ratchet gear 266.

The other end of the pawl 267 is pivoted to a sleeve 268 slidable on a rod 269. The rod 269 is pivoted to a shaft 270 extending between the frame plates 171 and 172 at the left side of the machine as shown in Figures 11 and 11a.

The rod has two spaced abutments 269a and 269b fixed thereon. A tension spring 271 is secured at one end to the sleeve 268 and at the other end to the abutment 269a.

As the walker beam is oscillated to move the pawl 267 upward the ratchet tooth engaging end of the pawl will slide over the teeth 266a. Then as the pawl starts its downward movement it will engage the adjacent tooth 266a of the ratchet wheel to drive the wheel until it is released therefrom by virtue of the sleeve 268 striking the abutment 269b. The sleeve 268 thus cannot slide further on the rod 269 and the pawl 267 will be swung out of engagement with the gear teeth. In operation the pawl engages the teeth 266a at the top of its stroke but is disengaged before it reaches the bottom of its stroke so that a faster driving action is obtained since the walker beam will raise the pawl for a distance of two teeth on the ratchet gear, but the pawl will only lower the engaged tooth one step, since it is disengaged from this tooth before the walker beam completes its downward stroke. This moves the indexing mechanism in one quarter cycle of arm 262 instead of a half cycle.

The pawl 264 on the other end of the walker beam 260 engages pins 265 on its upstroke and moves the ratchet gear 266 whenever a pin is engaged for resetting the gear in accordance with the demand of the machine as will be hereinafter more fully described. A selective positioning of the pins 265 makes possible an adjustment of the machine to throw various parts thereof into and out of operation at different timed increments as will be hereinafter described.

An indexing plate 275 is also keyed on the shaft 219 and is thus rotated in accordance with movements imparted to the shaft by the ratchet gear 266. If desired both gear 266 and plate 275 can rotate freely on shaft 219 by securing the gear and plate together so that the plate will be driven by the gear.

As best shown in Figure 19 the indexing plate 275 has an inner circle of holes 275a and an outer circle of holes 275—b therethrough. Pins 276 are selectively positioned in the holes 275a and extend toward the right hand side of the machine as shown in Figure 11.

Pins 277 are selectively positioned in the holes 275b and project from the opposite side of the plate 275. Another set of pins 278 are selectively positioned in the holes 275b and extend from the same side of the plate as the pins 276.

As the plate 275 is rotated, the pins 278 strike the teeth of a ratchet gear 280 keyed to the shaft 250. The shaft 250 is thus rotated to operate the cams 249 and 252 thereon. As shown in Figure 11, the cams 249 control the ejector bars 241. The cams 252 control the ejector bars 251.

As shown in Figure 11, another cam 281 is also keyed on the shaft 250 for a purpose to be hereinafter described.

As shown in Figure 11, a short shaft 282 is mounted above the shaft 219. As best shown in Figures 19 and 20, the shaft 282 supports a tripping frame 283 which extends downwardly in front of the plate 275 and is operated by the pins 276 inserted therein. As shown in Figure 16, the tripping device 283 controls the actuating member 205a of the air valve as will be hereinafter more fully described.

A star wheel 284 is also rotatably mounted on the shaft 282 and is driven by the pins 277 on the plate 275. The star wheel drives a cam 285 also rotatably mounted on the shaft 282. As shown in Figure 16, this cam 285 controls the actuating device 207a of the air valve 207.

The cylinder controlling air valves

As best shown in Figures 21 and 22 the air valve 205 is connected with a source of compressed air through an inlet pipe 290. The valve has an inlet chamber 291 communicating through ports 291a with the interior of a sleeve 292 defining a control chamber 293. Ports 291b through the sleeve 291 join the control chamber 293 with an outlet 294 communicating with the tube 203 leading to the front end of the cylinder 197 as shown in Figure 11. Ports 291c join the working chamber 293 with an outlet 295 communicating with the pipe line 204 leading to the rear end of the cylinder 197.

Exhaust ports 296 and 297 communicate with the open ends of the sleeves 292 and are joined through a by-pass 298. An exhaust tube 299 communicating with the atmosphere receives exhaust from the ports 296 and 297.

The control device 205a for the valve 205 carries vertically spaced pistons 300 and 301 slidable in the sleeve 292 and held in spaced relation by means of a spacer 302.

A coil spring 303 is disposed around the projecting end of the control member 205a and held under compression between the bottom of the valve and a collar 304. The pistons 300 and 301 are thus held by the spring at the bottom of their stroke so that compressed air from the inlet 291 is normally directed to the rear end of the cylinder 297 and the fingers of the assembly rack thus normally project through the ejector plate 162 as shown in Figure 3. However, when the tripping device 283 is actuated to move the control rod 205a of the valve upwardly, the piston 304 will be raised above the ports 291c while the piston 300 will be raised above the ports 291b. Thus, air in the rear end of the cylinder 197 will be exhausted through the ports 291c into the exhaust port 297 and from this exhaust port 297 through the by-pass 298 into the exhaust pipe 299. At the same time, however, air from the inlet 291 will enter the ports 291a, pass through the working chamber 293 and out of the ports 291b into the pipe line 203 to the front end of the cylinder 197. This will force the piston in the cylinder toward the rear of the machine for retracting the assembly rack through the ejector plate.

When the tripping device 283 again drops to its normal position the spring 303 will return the control rod 205a to the position shown in Figure 21 and air from the front end of the cylinder 197 will be exhausted through the pipe 203, ports 291b, and discharge pipe 299. At the same time, however, air will again be admitted to the rear end of the cylinder 197 through the pipe line 204.

The air valve 207 controlled by the cam 285 is similar to the valve 205. For example, in the air valve 207 the tube 190 communicating with the cylinder 186 receives air from the ports 291b and discharges air back thru these ports. Likewise, the tube 191 communicating with the cylinder 185 receives air from the ports 291c and discharges the air back thru these ports.

Electrical control for feed rolls

As described hereinabove the feed rolls 86 and 87 are successively driven through a series of steps and their operating periods are controlled by solenoids 125 and 136 respectively. When either one of these solenoids is energized, the corresponding feed roll is de-energized. Since the feed roll 86 drives the web A, it follows that it should remain in intermitten operation for a sufficient series of steps to seat the desired number of cell case strips in the assembly rack. After the desired number of strips have been seated, the roll should be stopped, and this is accomplished by electrically energizing the solenoid 125. During the driving of the roll 86, the solenoid 136 has been energized so that the feed roll 87 is stopped.

After the roll 86 supplies the desired number of cell case strips to the assembly rack, from the web A, the roll 86 is driven to supply a desired number of mating cell case strips to the assembly rack from the web B. For this purpose, the solenoid 125 must then be energized and the solenoid 136 must be de-energized.

Then when the assembly rack reaches the bottom of its stroke, the finished cell case must be ejected and, during this ejecting operation, both feed rolls should be stopped. Under the circumstances, both solenoids must be energized.

The solenoids are electrically controlled, as best shown in Figure 23. In Figure 23 the reference numeral 310 designates a power line communicating with one terminal of both solenoids 125 and 136. The reference numeral 311 designates a power line which communicates with a double contact switch 312 having a control button 312a operated by the cam 281 on the shaft 250.

A wire 313 joins one side of the switch 312 with the other terminal of the solenoid 125. A second wire 314 joins another side of the switch with the other terminal of the solenoid 136.

As the button 312a rides over the high and low portions of the cam 281, the solenoids 125 and 136 will be alternately energized. For example, the solenoid 136 will be energized to stop the feed roll 87 through a series of steps while the solenoid 125 is de-energized to permit driving of the feed roll 86 through a series of steps. Then, as the double contact switch 312 has the button 312a thereof riding over other portions of the cam, the solenoid 125 will be energized to stop the feed roll 86 while the solenoid 136 is de-energized for permitting driving of the roll 87.

In order to stop the feed rolls for ejection of the finished cell case, a parallel circuit is provided. As shown in Figure 23, a wire 315 extends from the power line 311 to a single contact switch 316 having the control button 316a thereof operated by a contact block 317 carried by the vertically movable carriage 176. A wire 318 joins the other side of the switch 316 with a manually operated switch 319. This manually operated switch can selectively contact wires 320 or 321 leading to the terminals of the solenoids 125 and 136 respectively. If the solenoid 136 controlling the operation of the feed roll 87 for the web B is de-energized by the switch 312 so that the feed roll 87 is operating to supply cell case strips to the assembly rack on the down stroke of the rack, this feed roll should be stopped when the cell case is finished so as to permit ejection of the finished cell case. The manual switch 319 is thus placed into contact with the wire 321 as shown in Figure 23. Then as the carriage 176 carries the assembly rack to the bottom of its stroke, the block 317 will contact the button 316a of the switch 316 for energizing the solenoid 136. This will stop the feed roll 87.

The solenoids therefore act as brakes for the feed rolls since, whenever they are energized, the feed rolls controlled thereby are stopped.

Modified punch press mechanism

Instead of having the punch press mounted in an auxiliary frame slidable on top of the main frame of the cell case machine, the press may be built directly in the main frame of the machine as shown in Figures 24 and 25. In these figures the reference numeral 330 designates the main side frame plates connected at their front ends by a cross frame plate 331. The main drive shaft 59 for the cell case machine extends transversely between the plates 330 and is driven by the motor 30.

Vertical ways 332 are formed on the outer faces of the plates 330 as shown in Figure 24 and receive slidable blocks 333. These blocks 333 are driven up and down in the ways 332 by eccentrics 334 on the main drive shaft 59. Rods 335 connect the eccentrics with the blocks 333.

The plates 330 are apertured as at 330a along the path of the blocks 333. A cross beam 336 extends transversely between the plates 330 and through the apertures 330a thereof. The ends of the beam 336 are secured to the tops of the slidable blocks 333. A second cross beam 337 extends transversely between the plates 330 and through the apertures 330a thereof and is secured at its ends to the lower ends of the blocks 333. These cross beams are thus moved up and down with the blocks 333.

A punch bed 338 is fixedly mounted to the frame plate 330 beneath the beam 336. A second punch bed 339 is fixedly mounted between the plates 330 beneath the beam 337.

The beds 338 and 339 support die holders 340 at the tops thereof and carry suction boxes 341 across the bottoms thereof. The suction boxes are evacuated by means of suction tubes 342. Punchings received from dies carried by the die carriers 340 are thus sucked downwardly through the beds 338 and 339 into the suction boxes 341 and can be removed from these boxes.

The beams 336 and 337 support die carriers 343 on the bottom faces thereof.

As best shown in Figures 26 and 27 the die carriers 343 hold dies 344. Each die 344 comprises a longitudinally slotted block 345 having the slot 346 thereof extending from one end into spaced relation to the other end thereof. An aperture 347 extends through the block 345 and communicates with the slot. A plurality of screws 348 are threaded in the block along one side of the slot 346. These screws have heads 349 provided with flat portions 349a.

A slot-cutting knife 350 is adapted to be mounted in the slot 346 and project from the bottom of the block 345 when the flat portions 349a of the screw heads 349 are aligned with the slots. Rotations of the screws through a quarter turn, however, will clamp the knife 350 in the slot since the flat portions 349a will be moved away from the slots and the round heads of the screws will press against the knife.

A punch 351 has a round shank portion 351a seated in the aperture 347 of the block 345 and held therein by means of a screw 352 extending transversely through the block for decreasing the width of the slot 346. The punch 351 has a tear-drop shaped head portion 351b projecting from the bottom of the block. The apex of the head registers with the end of the knife 350 so that the punch head and knife will form a slot with a divergent end portion.

The die blocks 345 are disposed at spaced intervals across the holders 343 on the beam members 336 and 337 so that the punches and knives carried thereby can form the desired slots in the webs A and B. As shown in Figure 25, the knives 350 carried in the top punch are positioned forwardly of the knives 350 carried by the bottom punch.

As shown in Figures 28 and 29, female die blocks 360 are provided for carrying female die plates 361 beneath the knives and punches of the male dies. The plates 361 are held on the blocks 360 by means of screws 362. Each plate 361 has a tear-drop shaped aperture 363 merging into a slot 364. The aperture 363 is adapted to receive a punch head 351b while the slot 364 is adapted to receive the knife 350. The slot 364 is usually longer than the knife 350 so that the knives can be replaced with shorter or longer knives to produce slots of the desired length in the webs A and B. The die block 360 is apertured beneath the apertures in the plates to permit passage of the punchings therethrough into the suction boxes 341.

In this modified punch press construction, the press assembly is not movable toward and away from the cutters and if it is desired to adjust the machine for producing cell case strips of different heights, an even number of these heights must be accommodated between the punches and the strip severing cutters so that the webs will be severed at the divergent ends of the slots therein. For this purpose a web take-up means is interposed between the punches and cutters.

The web take-up means

As shown in Figures 24 and 25 a pair of large diameter gears 370 are rotatably mounted on the frame plates 330 in front of the punches. The gears 370 rotatably support take-up rollers 371. A shaft 372 extends transversely through the plates 330 and has small gears 373 thereon meshing with the gears 370.

A crank 374 is provided on the end of the shaft 372 on the outside of the frame plate 330. Operation of the crank 374 will rotate the gears 370 to carry the take-up rollers 331 from positions shown in solid lines to positions shown in dotted lines in Figure 25.

Another pair of large diameter gears 380 are rotatably mounted behind and below the gears 370. The gears 380 rotatably support take-up rolls 381. A shaft 382 has small gears 383 thereon meshing with the gears 380. A crank 384 is keyed on one end of the shaft 382. Operation of this crank will turn the gears 380 to move the rolls 381 from positions shown in solid lines to positions shown in dotted lines in Figure 25.

As shown in Figure 25, the web A is threaded around the rolls 371 while the web B is threaded around the rolls 381. Positioning of these rolls can vary the length of the portion of the web between the punches and the cutters.

The regular feed rolls 86 and 87 draw the webs A and B over the take-up rolls and pass the leading edges of the webs under a stationary vertical knife 390 mounted in a carrier 391 extending transversely between the frame plates 330. The knife 390 is bolted to the carrier by means of bolts 392 and is adjusted vertically relative to the carrier by means of adjusting bolts 393.

The movable knife 144 cooperating with the vertical stationary knife 390 is the same as described in Figure 8.

It should be understood that the vertical stationary knife can be used in place of the sloping stationary knife 141 shown in Figure 8.

The web take-up rollers 371 and 381 make possible the use of a punch press mechanism which is mounted in fixed spaced relation from the cutters, since the adjustment of the amount of wrap of the webs around these rolls will determine the length of the web portion between the punches and the cutters, thereby making it possible to position an equal number of cell case strip widths or heights between the cutters and the punches. Without the use of the take-up rolls it is necessary to adjust the position of the punch relative to the cutters when the machine is changed over to form cell case strips of different heights than those for which it was originally set.

*Summary of operation of the machine*

As best shown in Figure 1, two webs of paper A and B are supplied from rolls R and R' and are fed in a slack condition to the feeder trays of the cell case machine by means of the unreeling device 10. The unreeling device automatically unwinds the rolls R and R' whenever the slack in the webs entering the feeder trays is taken up.

The feeder trays flatten out the webs and supply the same to the punch of the machine which contains superimposed pairs of punches for cutting longitudinal slots in spaced transverse relation across the width of the web.

A feed roll 86 acts against the top web A to pull the same through the feeder trays and the punches, and to push the leading ends of the webs between the stationary and movable cutters. A similar feed roll 87 is provided for the web B. The punch can be adjustable toward and away from the cutters as shown in Figure 1, or can be stationary as shown in Figure 25. When a movable punch is used, the desired spacing from the cutters is obtained by moving the entire punch assembly. When the stationary punch is used, web take-up means are provided between the punch and cutters so that the web lengths between the punches and cutters can be an equal multiple of the height or width of the cell case strips to be formed therefrom. These adjustments and take-up devices are necessary in a widely adjustable machine of the present type so that the cutters will act on the webs at the ends of the slots punched therein.

Each feed roll is driven alternately through a series of steps by means of the oscillating rack bar 102 as shown in Figure 1. A ratchet device is interposed between the feed roll drive and the feed rolls so that the rolls are only moved forward for a predetermined amount. Solenoid brakes 125 and 136 are provided for alternately stopping the feed rolls after the same have moved their webs forward to seat a desired number of cell case strips in the assembly rack. These solenoids are energized to stop rotation of their feed rolls through a switch 312 operated by a cam 281 driven from a cam shaft 250 at a rate determined by the positioning of pins 265 on a control ratchet gear 266 which drives an indexing plate 275 having selectively positioned pins 278 thereon for driving a gear 280 keyed to the shaft.

The assembly rack mechanism is raised and lowered step by step through one set of positively operating fingers or pawls 225 and 230. The fingers 225 are carried by a rack raising beam 218 and engage a rack bar 240 to raise this bar and the assembly rack step by step in accordance with the throw of the rock raising beam. Another set of fingers 225 and 230 are provided for cooperating with a rack lowering beam 218 which also can have the throw thereof adjusted.

The fingers 225 and 230 are controlled by ejector levers 241 and 251 so that they will operate on the assembly rack at the proper time interval. These ejector levers are controlled from cams 249 and 252 mounted on the cam shaft 250. This cam shaft 250 is selectively and adjustably driven as pointed out above. If desired the cams 249 can be dispensed with and only a single ejector lever 241 used to cooperate with the rack lowering beam 218. This single lever is spring pulled to urge the pawl or finger 230 away from the teeth on the assembly rack carriage. The finger 230 engages a tooth by sliding over the top of the lever and the spring is not strong enough to retract the lever as long as the finger carries the load of the carriage.

The assembly rack mechanism is rotated through a 90° turn at the top of its stroke and retracted through an ejector plate at the bottom of its stroke by means of compressed air controlled cylinders. These cylinders receive air from air valves 205 and 207. The air valves are controlled to operate at proper timed intervals by devices actuated from pins 276 and 277 on the indexing plate 275. A wide selection of positions of these pins on the indexing plate makes possible a wide adjustment of the machine.

The amount of throw of the assembly rack raising and lowering beams can be adjusted so that the cell case strips can be spaced apart any desired distance. The machine can be set to feed any number of strips into the assembly rack for producing a wide range of cell cases.

From the above description, it should be understood that the machines of this invention are widely adjustable and that the adjustments can be accomplished by selective positioning of pins on an indexing plate and on an indexing plate driving gear. Cell case openings of any desired size can be produced by adjusting the throw of the raising and lowering beams for the cell case assembly rack. The finger or pawl raising and lowering mechanism for the assembly rack and the air pressure rotation and retraction of the assembly rack make possible a rapidly and positively operating assembly end for the cell case machine.

It will, of course, be understood that numerous details of construction may be varied through a wide range without departing from the principles of this invention, and it is therefore not the purpose to limit the patent granted hereon otherwise than is necessitated by the scope of the appended claims.

I claim as my invention:

1. In a cell case machine including a pair of feeder trays, an unreeling device for feeding a separate web in slack condition to each of said feeder trays, means for punching slots in said webs, and a web-severing device adapted to cut the webs into cell case strips, the improvements which comprise a pair of feed rolls positioned between the punching means and the severing device, each feed roll continually engaging a web to pull the webs through the feeder trays and punching means and to push the leading ends of the webs beyond the severing device, means for alternately driving each of said feed rolls through a series of intermittent steps, an assembly rack for receiving cell case strips from the severing device, and means for effecting relative movement between said assembly rack and said severing device for assembly of the strips into cell cases.

2. In a cell case machine including a pair of superimposed feeder trays, an unreeling device for feeding a separate web in slack condition to each of said feeder trays, drag blocks in said feeder trays to flatten out said webs, means for punching slots in said webs, and a web-severing device adapted to cut the webs into cell case strips, the improvements which comprise a separate feed roll continually engaging each of said webs, means for alternately driving each of said feed rolls through a series of intermittent steps to intermittently pull each web through its feeder tray and punching means and to push the leading end of each web beyond the severing device, means for varying the web lengths between the punching means and the severing device to provide an even multiple of cell case strip heights therebetween, and an assembly rack movable adjacent said severing device for receiving cell case strips therefrom to assemble said strips into cell cases.

3. In a cell case machine including means for feeding a pair of webs in spaced relation, punches acting on each of said webs to cut spaced longitudinal slots therein, and a web driving roll acting on each of said webs, the improvements which comprise means for alternately driving said rolls through a series of intermittent steps, a web-severing device receiving the leading ends of said webs therethrough, an assembly rack for seating the leading ends of said web, means actuating said severing device when said drive rolls are at rest to sever cell case strips from the leading ends of the webs after the same have been seated in the assembly rack, and means for moving said assembly rack relative to said severing device after each severing operation to assemble the strips into cell cases.

4. In a cell case machine, a movable carriage, an assembly rack mounted on said carriage for receiving strips of paper in interlocking relationship to form cell cases, and fluid pressure operated mechanism on said carriage for rotating said assembly rack.

5. In a cell case machine, a carriage, an assembly rack mounted on said carriage for receiving strips of paper in interlocking relationship to form cell cases, mechanism for moving said carriage and assembly rack in a single plane, and air pressure actuated mechanism on said carriage for rotating said assembly rack.

6. In a cell case machine, a cutter, an assembly rack adjacent said cutter for receiving cell case strips therefrom, a movable carriage supporting said rack, means for moving said carriage relative to the cutter to align various portions of the rack with the cutter for seating a series of spaced parallel strips in the rack, fluid pressure means on said carriage for rotating said rack, means for moving the carriage to align the rotated rack with the cutter to receive a second series of strips therefrom in interlocking relation to the first series of strips, and additional fluid pressure means on the carriage for discharging the assembled cell case from said rack.

7. In a cell case machine, a single assembly rack for receiving strips of paper in interlocking relation to form cell cases, a carriage for raising and lowering said assembly rack, an air pressure actuated mechanism on said carriage for rotating said assembly rack through a 90 degree turn at the top of its stroke and at the bottom of its stroke, and a second fluid pressure actuated mechanism on said carriage for discharging a cell case from the assembly rack.

8. In a cell case machine, an assembly rack for receiving strips of paper in interlocking relationship to form cell cases, a mechanism for raising said assembly rack a step at a time, a mechanism movable with the assembly rack for rotating said assembly rack at the top of its stroke, a mechanism for lowering said assembly rack a step at a time, a discharge plate cooperating with said assembly rack, and a mechanism for withdrawing said assembly rack through said discharge plate to eject a finished cell case from the rack.

9. In a cell case machine adapted to receive a pair of paper webs therethrough, and including a cutter for severing said webs into cell case strips together with feed rolls for driving said webs through the machine, the improvements which comprise mechanism for intermittently driving said feed rolls in one direction only, electrical devices for alternately acting on said mechanism to allow movement of only one feed roll at a time, an assembly rack adjacent said cutter for receiving the leading ends of said webs, mechanism for actuating said cutter when said feed rolls are at rest to sever the leading end of a web seated in said assembly rack from the web for forming a cell case strip, mechanism for raising said assembly rack a step at a time in front of said cutter to receive additional cell case strips therefrom, an air pressure device for rotating said assembly rack at the top of its stroke, mechanism for lowering said assembly rack a step at a time back in front of said cutter to receive additional cell case strips in interlocking relation to the first seated strips, and an air pressure device to discharge the finished cell case from the assembly rack.

10. In a cell case machine, a pair of vertical posts, a carriage extending between said posts and slidably mounted thereon, a pair of toothed racks on said carriage, a pawl engaging the teeth on one of said rack, means for raising said pawl to raise the carriage, a second pawl engaging the teeth on the other of said racks, means for lowering said pawl to lower said carriage, ejector bars alternately retracting said pawls from said racks to permit raising of the carriage a step at a time and lowering of the carriage a step at a time, a shaft rotatably mounted in said carriage, a plate mounted on the end of said shaft, an assembly rack mounted around said shaft behind said plate and having cell case strip receiving fingers projecting through the plate, fluid pressure actuated means on said carriage to rotate said shaft for turning said assembly rack, and additional fluid pressure actuated means on said carriage for sliding said assembly rack on said shaft to retract the fingers from said plate.

11. In a cell case machine, a vertically movable carriage, a shaft extending forwardly from said carriage, an apertured plate mounted on the end of said shaft, a gear keyed on said shaft, a rack carried by said carriage engaging said gear, air pressure cylinders receiving the ends of said rack, pistons on said rack ends slidable in said cylinders behind said pistons for oscillating the rack to rotate said shaft, an assembly rack plate slidably mounted on said shaft between said carriage and said apertured plate, fingers on said assembly rack plate adapted to project through the apertures of said plate, and a double-acting air jack to slide said assembly rack plate on said shaft.

12. An assembly rack for a cell case machine comprising an H-shaped plate having slotted legs, channel strips extending across said plate and adjustably secured in said slotted legs, and cell case strip receiving fingers adjustably mounted on said channel strips.

13. An assembly rack comprising a plate having slotted top and bottom portions, strips extending in front of said plate, bolts extending through said slots and secured to said strips for adjustably holding said strips on said plate, a plurality of cell case strip receiving fingers mounted on said strips, and means for adjusting said fingers on said strips.

14. A cell case strip receiving finger for a cell case machine comprising a member having spaced opposed top and bottom lips, a U-shaped plate having the side walls thereof slidable along said top lip and the base thereof adapted to rest on said bottom lip, and a spring in said U-shaped plate urging the base thereof against the bottom lip.

15. In a cell case machine, a pair of vertical posts, a carriage slidably mounted on said posts, an assembly rack supported by said carriage, means for raising and lowering said carriage and assembly rack a step at a time, said assembly rack having a well formed in the top thereof, a rod supported by said posts extending into said well, and means for introducing a fluid under pressure beneath said rod into said well for exerting a down pressure on said carriage to prevent bouncing thereof.

16. In a cell case machine, a main drive shaft, a secondary drive shaft, an eccentric connection between said drive shafts to oscillate the secondary drive shaft from the main drive shaft, an assembly rack for assembling cell case strips into cell cases, an assembly rack raising beam oscillated from said second shaft, a finger carried by said raising beam, a toothed rack carried by said assembly rack for engagement with said finger, and means for adjusting the throw of the raising beam to regulate the step by step degree of raising said assembly rack.

17. In a cell case machine, a web severing cutter, an assembly rack structure movable in front of said cutter for receiving cell case strips therefrom, said structure having toothed racks on the back face thereof, a rack raising beam and a rack lowering beam tiltably mounted behind said structure, fingers on said beams engageable with said racks, ejector bars alternately cooperating with said fingers to permit step by step raising and lowering of the assembly rack structure, and additional holding fingers cooperating with said toothed racks to hold said assembly rack structure in position while the actuating fingers are being moved into tooth-receiving positions.

18. In a cell case machine, an assembly rack structure for receiving cell case strips in interlocking relation, vertically spaced teeth on the back of said structure, raising and lowering fingers engageable with said teeth, tiltable beams carrying said fingers, means for adjusting the throw of said beams to vary the raising and lowering steps, ejector bars alternately retracting said fingers from said teeth, and cams for controlling operation of said ejector bars in properly timed sequence.

19. In a cell case machine having a vertically movable cell case assembly structure mounted in front of a web severing device for receiving cell case strips therefrom, the improvement which comprises oscillating beams for raising and lowering said structure a step at a time, and ratchet and pawl devices operatively connecting said beams with said structure.

20. In a cell case machine having a vertically movable cell case assembly structure mounted in front of a web severing device for receiving cell case strips therefrom, the improvement which comprises oscillating beams for raising and lowering said structure a step at a time, ratchet and pawl devices operatively connecting said beams with said structure, and means for adjusting the throw of said beams to vary the step by step raising and lowering of the assembly rack structure.

21. In a cell case machine, an assembly rack structure mounted for vertical movement in said machine, vertically spaced teeth projecting from said structure, a tiltable beam mounted behind said teeth, a pawl pivotally mounted on said beam adapted to engage said teeth, means for tilting the beam to raise and lower said pawl, a second pawl mounted above said beam carried pawl, spring means urging said second pawl into engagement with said teeth, and means on said beam retracting said second pawl from said teeth whenever said beam carried pawl engages a tooth to lower the assembly rack structure on the down stroke of the beam.

22. In a cell case machine having a vertically movable assembly rack structure for assembling cell case strips into cell cases, the improvement which comprises vertically spaced teeth projecting from said structure, a spring-urged holding pawl adapted to engage said teeth, a lowering beam pivotally mounted on said machine, means for oscillating said lowering beam, a spring-urged pawl mounted on said lowering beam adapted to engage said teeth for lowering the assembly rack structure a step at a time, an ejector bar for disengaging said beam carried pawl from said teeth on the up stroke of said beam, and means for ejecting said holding pawl from said teeth on the down stroke of said beam.

23. In a cell case machine having a vertically movable assembly rack structure for receiving cell case strips in interlocking relationship to form cell cases, the improvement which comprises vertically spaced teeth projecting from said structure, a holding pawl engageable in said teeth to hold the structure at a fixed level, a raising beam tiltably mounted behind said teeth, a pawl pivotally mounted on said raising beam adapted to engage said teeth, means for tilting said beam to raise the pawl thereon for lifting the assembly rack structure, and an ejector bar for disengaging both pawls from said teeth.

24. In a cell case machine, a main drive shaft, an eccentric mounted on said drive shaft, a secondary drive shaft, a rod connecting said eccentric with said secondary drive shaft to oscillate the latter, an idler shaft, a ratchet gear rotatably mounted on the idler shaft, pins projecting from a face of said ratchet gear, a walking beam rotatably mounted on said idler shaft, a pawl on one end of said walking beam engageable with said pins, a second pawl on the other end of said walking beam engageable with the teeth of said ratchet gear, an indexing plate driven by said ratchet gear, said indexing plate having a plurality of holes therein, pins selectively positioned in said holes, a cam shaft, a gear keyed to said shaft and adapted to be driven by certain of said pins on said indexing plate, cams on said cam shaft controlling the operation of various parts of the cell case machine, fluid pressure means controlling other parts of said cell case machine, fluid pressure control valves for said means, and devices actuated by other of said pins on said indexing plate for operating said control valves.

25. In a cell case machine, the improvement which comprises a perforated indexing plate, means for intermittently driving said plate from the main drive shaft of the cell case machine, pins selectively seatable in the perforations of said indexing plate, and cam and valve mechanisms actuated by said pins whereby said machine is adjustably timed through selective positioning of said pins in said indexing plate.

26. In a cell case machine having a movable assembly rack and feed rolls for supplying cell case strips to said assembly rack, the improvement which comprises a main drive shaft, a secondary drive shaft oscillated by said main drive shaft, a cam shaft, indexing means selectively driving said cam shaft from said secondary drive shaft, the cams on said drive shaft controlling movement of said assembly rack, an electric switch, an additional cam on said cam shaft operating said switch, and solenoids controlling said feed rolls energized by said switch whereby said main drive shaft controls the proper sequential operation of said assembly rack and said feed rolls.

27. In a cell case machine including means for feeding a pair of superimposed webs, and a punching device acting on said webs to cut slots therein, the improvements which comprise a severing device to sever the leading ends of said webs into cell case strips, an assembly rack vertically movable in front of said severing device for receiving cell case strips therefrom, a feed roll for driving each of said webs to pull the same through said punches and to push the leading ends thereof through said severing device into said assembly rack, means for intermittently driving said feed rolls, solenoids for rendering one feed roll inoperative when the other feed roll is operating, and means carried by said assembly rack to energize a solenoid for stopping the operating feed roll when the assembly rack reaches the bottom of its stroke.

28. In a cell case machine having an assembly rack, the improvement which comprises fluid pressure means for operating said rack, an indexing plate having a plurality of holes therethrough, pins selectively positioned in said holes, tripping devices actuated by said pins, and air valves controlling said fluid pressure means actuated by said tripping devices whereby selective positioning of said pins will time the operation of said fluid pressure means.

CARL J. DELEGARD.